United States Patent
Fern et al.

(10) Patent No.: US 10,733,373 B2
(45) Date of Patent: Aug. 4, 2020

(54) DOCUMENT HISTORY INTERFACE

(71) Applicant: Microsoft Technology Licensing, LLC, Redmond, WA (US)

(72) Inventors: Kenneth Fern, Bellevue, WA (US); Alexander Darrow, Seattle, WA (US); Joseph Masterson, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 89 days.

(21) Appl. No.: 14/982,832

(22) Filed: Dec. 29, 2015

(65) Prior Publication Data

US 2017/0185574 A1    Jun. 29, 2017

(51) Int. Cl.
| | | |
|---|---|---|
| G06F 3/00 | (2006.01) | |
| G06F 40/197 | (2020.01) | |
| G06F 9/451 | (2018.01) | |
| G06Q 10/10 | (2012.01) | |
| G06F 40/117 | (2020.01) | |

(Continued)

(52) U.S. Cl.
CPC .......... *G06F 40/197* (2020.01); *G06F 3/0485* (2013.01); *G06F 3/04842* (2013.01); *G06F 9/453* (2018.02); *G06F 40/117* (2020.01); *G06F 40/166* (2020.01); *G06Q 10/101* (2013.01); *G06Q 10/103* (2013.01)

(58) Field of Classification Search
CPC ............. G06F 17/2288; G06F 3/04842; G06F 3/0485; G06F 9/4446; G06F 17/241; G06F 40/197; G06F 40/117; G06F 40/166; G06F 9/453; G06Q 10/101; G06Q 10/103

See application file for complete search history.

(56) References Cited

U.S. PATENT DOCUMENTS 8,566,301 B2    10/2013    Rueben et al.
8,738,706 B1    5/2014    Grieve et al.
(Continued)

FOREIGN PATENT DOCUMENTS

WO    2018200173 A1    11/2018

OTHER PUBLICATIONS

"Team Up to Build Powerful Documents", Retrieved on: Oct. 9, 2015 Available at: https://www.zoho.com/docs/writer.html, 7 pgs.

(Continued)

Primary Examiner — Kyle R Stork

(57) ABSTRACT

A document history interface provides a visual document history. In particular, document history application provides for tracking, storing and presenting events occurring over a document lifecycle to provide a robust interface for visualizing and accessing the document's history. In aspects, an interactive document timeline with a scroll control is provided to roll back through the document history. The interactive document timeline includes visual indicators for events that occurred during the document lifecycle, including but not limited to authoring events, communication events, and document branching events. A play control is further provided with the interactive document timeline such that a time-lapse rendition of events occurring over the document history may be displayed. In some aspects, upon scrolling to particular points along the interactive document timeline, legacy versions of the document may be saved as new documents.

20 Claims, 15 Drawing Sheets

(51) Int. Cl.
*G06F 40/166* (2020.01)
*G06F 3/0484* (2013.01)
*G06F 3/0485* (2013.01)

(56) References Cited

U.S. PATENT DOCUMENTS

| | | |
|---|---|---|
| 8,739,021 B2 | 5/2014 | Yuniardi |
| 9,053,079 B2 | 6/2015 | Bailor et al. |
| 9,135,312 B2 | 9/2015 | Greenspan et al. |
| 9,208,153 B1 | 12/2015 | Zaveri et al. |
| 2007/0060205 A1* | 3/2007 | Kim ............... G06Q 10/02 455/566 |
| 2010/0023851 A1* | 1/2010 | Schormann ............ G06Q 10/10 715/232 |
| 2012/0185762 A1 | 7/2012 | Ozer et al. |
| 2012/0192086 A1 | 7/2012 | Ghods et al. |
| 2012/0271867 A1* | 10/2012 | Grossman ........... G06F 17/2288 707/821 |
| 2012/0272151 A1* | 10/2012 | Grossman ........... G06F 17/2288 715/719 |
| 2013/0262420 A1* | 10/2013 | Edelstein ........... G06F 17/2288 707/695 |
| 2014/0033068 A1 | 1/2014 | Gupta et al. |
| 2014/0279843 A1 | 9/2014 | Von Weihe |
| 2014/0281872 A1 | 9/2014 | Glover |
| 2014/0298198 A1 | 10/2014 | Kuchibhotla et al. |
| 2015/0100580 A1* | 4/2015 | Mathur ............... G06Q 10/107 707/737 |
| 2015/0134600 A1 | 5/2015 | Eisner et al. |
| 2015/0339282 A1* | 11/2015 | Goyal .................. H04N 5/262 715/229 |
| 2018/0123815 A1 | 5/2018 | Milvaney et al. |

OTHER PUBLICATIONS

Bendix, et al., "VTML for Fine-Grained Change Tracking in Editing Structured Documents", In Proceedings of 9th International Symposium on System Configuration Management, Sep. 5, 1999, pp. 1-18.

Somers, James, "How I Reverse Engineered Google Docs", Published on: Nov. 5, 2014 Available at: http://features.jsomers.net/how-i-reverse-engineered-google-docs/, 11 pgs.

"Quip Changes the Way Teams Work Together", Retrieved on: Oct. 9, 2015 Available at: https://quip.com/about/tour, 5 pgs.

PCT International Search Report and Written Opinion in International Application PCT/US2016/066743, dated Apr. 6, 2017, 21 pgs.

Anonymous, "Revision Control—Wikipedia, the free encyclopedia", Jan. 8, 2014, retrieved from the internet: http://en.wikipedia.org/w/index.php?title=Revision_control&oldid=589765566, retrieved on Apr. 27, 2015, 10 pgs.

Belkadi, et al., "A Situation Model to Support Awareness in Collaborative Design", In International Journal of Human-Computer Studies, vol. 71, Issue 1, Jan. 1, 2013, pp. 110-129.

"International Search Report and Written Opinion Issued in PCT Application No. PCT/US2019/060373", dated Apr. 15, 2020, 13 Pages.

* cited by examiner

FIG. 9

DOCUMENT HISTORY INTERFACE

BACKGROUND

A visual history of a lifecycle of a document, including changes made to a document during one or more authoring sessions, has not traditionally been available. While a document author or editor can "undo" and "redo" changes in the temporal order in which the changes were made, this functionality is limited to a predetermined number of stored changes and does not extend to changes that were made during prior authoring sessions. In collaborative document editing, coauthors are able to see a summary of changes made by other users, e.g., based on alternative font colors and/or tracked changes. However, coauthors are not able to undo/redo the changes made by others. In many respects, a robust mechanism for visualizing and accessing a document history does not exist due to the extensive overhead required to map and store changes—particularly changes made by multiple users over multiple stored versions of a document. Accordingly, other communication tools and mediums have been developed and relied on by coauthors to coordinate and comment on changes, e.g., such as instant messaging (IM), short message service (SMS), Yammer, Skype, SharePoint, etc. However, these tools add complexity rather than an overarching solution. For instance, while these additional communications tools are useful in point solutions, they also create the need for users to visit multiple locations to obtain a complete picture of related information, tasks and obligations with respect to a document.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for providing a visual document history. In some aspects, the visual document history may be comprehensive, providing a complete record of events from a document creation time to a current time. In other aspects, the visual document history may be less comprehensive, providing a record of key or significant events from a document creation time to a current time. The systems and methods described herein provide for tracking, storing and presenting events occurring over a document lifecycle to provide a robust interface for visualizing and accessing the document's history. In aspects, an interactive document timeline with a scroll control is provided to roll back through the document history. The interactive document timeline includes visual indicators for events that occurred in a document lifecycle, including but not limited to authoring events (e.g., adding, deleting and/or changing content, formatting or inline comments within the document), communication events (e.g., sharing, communicating, meeting, conferencing, etc., regarding the document), and branching events (e.g., creating related documents). A play control may also be provided with the interactive document timeline such that a time-lapse rendition of events occurring over the document history may be successively displayed. In some aspects, upon scrolling to particular points along the interactive document timeline, legacy versions of the document may be saved as new documents.

In one aspect, a system is provided. The system includes a processing unit and a memory storing computer executable instructions that, when executed by the processing unit, cause the system to perform a method. The method includes providing a first version of a document and generating an interactive document timeline identifying at least one event associated with the document. The method further includes receiving a selection to scroll along the interactive document timeline to the at least one event and providing a second version of the document, where the second version of the document corresponds to the document as it existed at a time when the at least one event occurred. Additionally, the method includes retrieving additional information associated with the at least one event and providing the additional information.

In another aspect, a system is provided. The system includes a processing unit and a memory storing computer executable instructions that, when executed by the processing unit, cause the system to perform a method. The method includes providing a first version of a document and generating an interactive document timeline associated with the document. The method further includes receiving a selection to scroll to a position along the interactive document timeline and providing a second version of the document, where the second version of the document corresponds to the document as it existed at a time associated with the position. Additionally, the method includes saving the second version of the document as a new document.

In yet another aspect, a method of extracting a portion of an attached file and embedding the extracted portion in a message is provided. The method includes providing a first version of a document and generating an interactive document timeline identifying at least one event associated with the document. The method further includes receiving a selection to scroll along the interactive document timeline to the at least one event, where the at least one event is an authoring session. Additionally, the method includes generating an interactive event timeline identifying at least one authoring event associated with the authoring session, receiving a selection to scroll along the interactive event timeline to the at least one authoring event, and providing a second version of the document, where the second version of the document corresponds to the document as it existed at a time when the at least one authoring event occurred.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 9 illustrates an exemplary document history interface for displaying a first version of a document based on an event timeline, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to systems and methods for providing a visual document history. In particular, the systems and methods provide for tracking, storing and presenting events occurring over a document lifecycle to provide a robust interface for visualizing and accessing the document's history. In aspects, an interactive document timeline with a scroll control is provided to roll back through the document history. The interactive document timeline includes visual indicators for events that occurred during the document lifecycle, including but not limited to authoring events (e.g., adding, deleting and/or changing content, formatting or inline comments within the document), communication events (e.g., sharing, communicating, meeting, conferencing, etc., regarding the document), and branching events (e.g., creating related documents). A play control may also be provided with the interactive document timeline such that a time-lapse rendition of events occurring during the document history may be successively displayed. In some aspects, upon scrolling to particular points along the interactive document timeline, legacy versions of the document may be saved as new documents.

Figure 1:
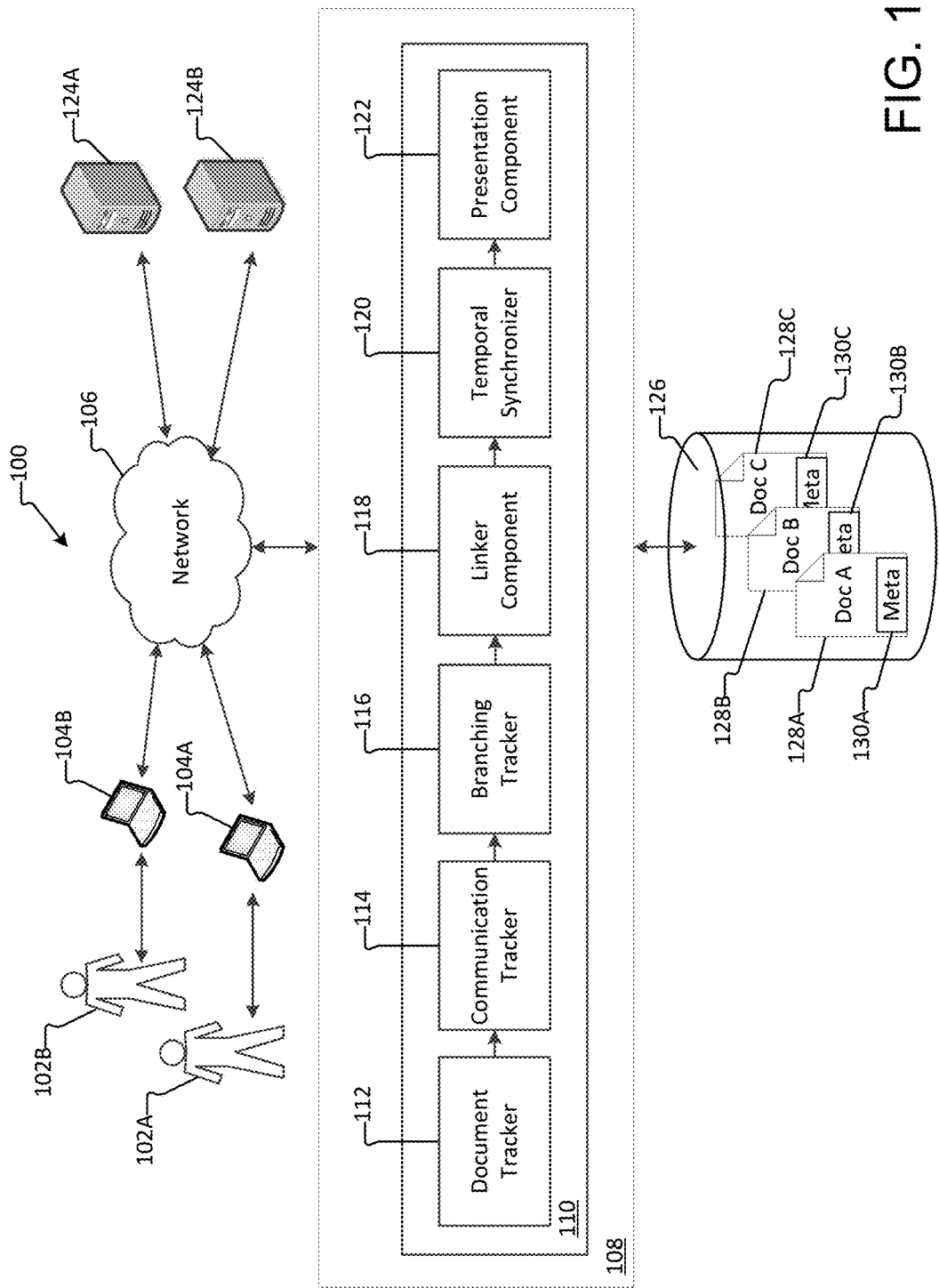
FIG. 1 illustrates an exemplary system for providing a document history interface, according to first embodiment.

FIG. 1 illustrates an exemplary system for providing a document history interface, according to first embodiment.

As illustrated, one or more client computing devices 104 (e.g., client computing devices 104A and 104B) may execute a client document history application capable of providing a client document history interface. In this example, the client document history application may be in communication with (e.g., via network 106) a corresponding server version of document history application 110 executed on one or more server computing devices, e.g., server computing device 108. In other aspects, rather than executing a client version of a document history application, the one or more client computing devices 104 may remotely access, e.g., via network 106, the document history application 110 implemented on one or more server computing devices 108. In this regard, document history application 110 may be capable of providing a document history interface accessed via network 106 by the one or more client computing devices 104.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox); a television; and the like. This list is exemplary only and should not be considered as limiting. Any suitable client computing device for executing a client document history application and/or remotely accessing document history application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet.

As described above, the document history application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud-based computing environment). Server computing device 108 may provide data regarding a document to and from the one or more client computing devices 104 via network 106, as described above. As used herein, a document may include any type of content, including graphical, audio, video, formatted, markup or plain text, in any file format, including digital document applications or collaborative authoring applications for creating and editing word processing documents, spreadsheets, presentations, publications, webpages, emails, and the like.

According to some aspects, the document history application 110 may be incorporated into, or in communication with, a word processing application. The word processing application may be executed locally on the one or more client computing devices 104 or executed remotely on server computing device 108 or on other server computing devices, e.g., server computing devices 124A and/or 124B. As used herein, a word processing application enables a user to author a document. In aspects, "authoring" the document may include creating the document, viewing the document (e.g., read-only access), editing the document (e.g., write access for additions, deletions, formatting changes, and the like), and/or commenting in the document (e.g., via notations, comment bubbles, etc.) during an authoring session. In some aspects, authoring and revising a document may involve "tracking" changes in the document (i.e., identifying changes with altered font, font color, etc.); in other aspects, authoring changes may not be distinguishable from original or new content. In further aspects, the document may be stored in a storage location accessible to the word processing application and/or the document history application 110, e.g., storage 126.

According to other aspects, the document history application 110 may be incorporated into, or in communication with, a collaborative authoring application. The collaborative authoring application may be executed locally on the one or more client computing devices 104 or executed remotely on server computing device 108 or other server computing devices, e.g., server computing devices 124A and/or 124B. As used herein, a collaborative authoring application enables a plurality of users to coauthor a single document from multiple locations at substantially the same or similar time. In aspects, as with authoring, "coauthoring" the document may include creating the document, viewing the document (e.g., read-only access), editing the document (e.g., write access for additions, deletions, formatting changes, and the like), and/or commenting in the document (e.g., via notations, comment bubbles, etc.) during an authoring session. In some aspects, coauthoring a document may involve "tracking" changes within in the document (i.e., identifying changes with altered font, font color, author identifier, etc.); in other aspects, coauthoring changes may not be distinguishable from original or new content. In some aspects, where authoring access to a document is granted to a single user, the collaborative authoring application essentially serves as a word processing application, as described above. In further aspects, the document (e.g., document 128A, document 128B, document 128C, etc.) may be stored in a storage location accessible to the collaborative authoring application and/or the document history application 110, e.g., storage 126.

Whether a document is authored by a single user or multiple users, communications regarding the document may occur outside of the word processing application and the collaborative authoring application. As used herein, "communications" regarding the document include sharing the document (e.g., via email, IM, SMS, social feed, or other communication medium), discussing the document (e.g., via audio conference, video conference, IM, SMS, social feed, etc.), meeting regarding the document (e.g., a calendar event), presenting the document (e.g., within a presentation document), assigning tasks for the document (e.g., a task action), providing approvals for the document (e.g., manager approval action prior to publication or other dissemination of the document), and the like.

In addition to taking the above actions with respect to a document, one or more users may create a derivative document based on an original document. That is, a user may create a second document based on and related to a first document. In some aspects, when a second document is created from a first document, a document tree is created. In some cases, user confirmation may be required to relate a first document and a created second document within a document tree. As used herein, a document tree is a hierarchical structure linking related documents. Each document in a document tree may be represented by a branch of the document tree, with the first document in a primary branch position and each subsequent document in a secondary, a tertiary, etc., branch position within the hierarchical structure. In further aspects, each branch of the document tree may be related temporally such that as each new document is created, a document creation time is associated with the point in time that the corresponding branch splits off in the document tree. Thus, each branch of the document tree may be related hierarchically and temporally to the other branches in the document tree whereby higher branch positions correspond to earlier document creation times and lower branch positions correspond to later document creation times. According to aspects, after a branch splits off, temporal events corresponding to the first document and the second document may be represented by parallel document timelines within the document tree.

As illustrated in FIG. 1, the document history application 110 may include a document tracker 112, a communication tracker 114, a branching tracker 116, a linker component 118, a temporal synchronizer 120, and a presentation component 122. The various components may be implemented using hardware, software, or a combination of hardware and software. As described above, the document history application 110 may be configured to receive and process data regarding authoring events (e.g., actions received from a word processing application or from a collaborative authoring application), communication events (e.g., received via an email application, calendaring application, tasking application, instant messaging application, video conferencing application, audio conferencing application, etc.), and branching events (e.g., related document creation actions received from a word processing application or from a collaborative authoring application).

For instance, the document tracker 112 may receive one or more authoring events. As described above, the document history application 110 may be incorporated into, or in communication with, a word processing application and/or a collaborative authoring application. The document tracker 112 may receive the one or more authoring events via such word processing application and/or collaborative authoring application. An authoring event may involve a user opening or viewing a document; adding, deleting or changing content; adding or changing formatting; adding, deleting or changing inline comments; and the like. In some aspects, an authoring event may include a change to a single character, where a character may include a letter, numerical digit, punctuation mark, space, etc., and where a change to a character may include adding or deleting a character, changing the formatting of a character, etc. In other aspects, an authoring event may include a change to a word (e.g., adding a word, deleting a word, modifying one or more characters of a word, adding or changing formatting of the word, etc.). An authoring event may further include adding, deleting and/or changing visual assets (e.g., pictures, charts, tables, etc.) associated with the document. In still other embodiments, an authoring event may involve a change to a cell (e.g., of a spreadsheet document), including adding, deleting or changing a formula; adding, deleting or changing a numeral; adding, deleting or changing a letter; adding or deleting a cell; adding, deleting or changing an operator; adding, deleting or changing a header; and the like. As should be appreciated, an authoring event may involve any event occurring within the content of the document, including a minor change affecting a single character to major changes such as significant additions and/or deletions of content.

According to further aspects, each authoring event may be associated with a timestamp designating a time when the authoring event occurred. The document tracker 112 may store each authoring event in a storage location, e.g., storage 126. In some aspects, each authoring event may be stored in a permanent and/or long-term storage location. Further, the document tracker 112 may index each authoring event based on the timestamp associated with the authoring event. Further still, the document tracker 112 may associate one or more authoring events with an authoring session of a user. Document tracker 112 may further store the duration of the authoring session and the identity of the user.

The communication tracker 114 may receive one or more communication events associated with the document. As noted above, communication events associated with a document include sharing the document (e.g., via email, IM, SMS, social feed, or other communication medium), discussing the document (e.g., via audio conference, video conference, IM, SMS, social feed, etc.), meeting regarding the document (e.g., a calendar event), presenting the document (e.g., in a presentation document or during a meeting), assigning tasks for the document (e.g., a task action), providing approvals for the document (e.g., manager approval action prior to publication or other dissemination of the document), and the like. As should be appreciated, communication events may be received by the communication tracker 114 via one or more communication applications, such as an email application, a calendaring application, a tasking application, an instant messaging application, a short message service (SMS), a video conferencing application, an audio conferencing application, a social feed (e.g., Yammer), and the like. In some aspects, the document may be tagged with an identifier, e.g., a textual identifier (e.g., document name), a numerical identifier (e.g., document reference number), a globally unique identifier (e.g., document GUID), and the like. In this case, a communication event may be recognized as associated with the document when the document identifier is detected by the communication application. For example, an email application may recognize a communication event associated with a document when the email application determines that the document was attached to or discussed within an email communication. In other aspects, a user may manually specify that an email communication is associated with the document (e.g., by specifying the document name in a subject field).

According to aspects, each communication event may be associated with a timestamp designating a time when the communication event occurred. When a communication event is part of a conversation thread, the timestamp may be associated with the first communication event in the conversation thread or the last communication event in the conversation thread; alternatively, the conversation thread may be associated with a period of time over which the conversation thread took place. In aspects, the communication tracker 114 may index each communication event based on the timestamp (or time period) associated with the communication event.

The branching tracker 116 may receive one or more branching events. As described above, the document history application 110 may be incorporated into, or in communication with, a word processing application and/or a collaborative authoring application. The branching tracker 116 may receive one or more branching events via such word processing application and/or collaborative authoring application. As described above, a branching event occurs when a second document is created that is based on or related to a first document. A branching event is associated with a document creation time that is associated with the point in time that the branch splits off of a document tree, i.e., the point in time that the second document is created based on the first document. As provided above, after a branch splits off, temporal events corresponding to the first document and the second document may be represented by parallel document timelines within the document tree. In aspects, the branching tracker 116 may index each branching event based on the timestamp associated with the branching event.

The linker component 118 may link one or more authoring events, communication events, and/or branching events to a document. According a first example, linker component 118 may create metadata referencing each event and may append the metadata to the document in order to link each event to the document (e.g., metadata 130A appended to document 128A, metadata 130B appended to document 128B, and metadata 130C appended to document 128C). As used herein, metadata may include any suitable identifier or reference for linking an event to a document, e.g., pointers, reference identifiers, hyperlinks, descriptors, etc. In a second example, linker component 118 may create metadata referencing an index of events associated with the document and may append the metadata to the document in order to link the indexed events to the document. As used herein, "appending" metadata to the document may involve linking the document to a separate metadata document (e.g., stored with the document or in another location, not shown) or may involve writing the metadata directly to the document (e.g., in a field associated with the document, shown).

For example, with respect to authoring events, linker component 118 may append metadata identifying each authoring event mapped to a storage location, e.g., storage 126, accessible to the document history application 110. In some cases, the appended metadata may further specify the timestamp of each authoring event. Alternatively, the metadata may identify each authoring event in an index, which may specify the timestamp of each authoring event as well as a location for each authoring event in storage.

With respect to communication events, linker component 118 may append metadata identifying each communication event associated with the document accessible via a communication application. In aspects, each identified communication event may be stored in a storage location associated with a communication application, e.g., an email application, a calendaring application, a tasking application, an instant messaging application, a short message service (SMS), a video conferencing application, an audio conferencing application, a social feed, and the like. In some cases, the appended metadata may further specify a timestamp for each communication event. Alternatively, the metadata may identify each communication event in an index, which specifies the timestamp of each communication event as well as a reference to each communication event available via a communication application.

With respect to branching events, linker component 118 may append metadata identifying each branching event as well as each related document. For instance, the metadata may be mapped to the one or more related documents in a storage location, e.g., storage 126, accessible to the document history application 110. In some cases, the appended metadata may further specify the timestamp of each branching event. Alternatively, the metadata may identify each branching event in an index, which specifies the timestamp of each branching event (i.e., the creation time for each related document) as well as a location for each related document in storage. In aspects, a related document timeline beginning at the creation time for each related document may be retrievable from metadata associated with the related document.

Temporal synchronizer 120 may temporally collate the one or more authoring events, communication events and/or branching events based on the timestamp associated with each event. In some cases, temporal synchronizer 120 may group certain events. For example, temporal synchronizer 120 may group authoring events that occurred during an authoring session for a particular user. In a further example, temporal synchronizer 120 may group communication events associated with a conversation thread. As used herein, a conversation thread refers to a first communication event initiated by a first user that involves one or more second communication events in reply. In some aspects, temporal synchronizer 120 may create a document history outline for the document that is mapped to each event or group of events in temporal order. In further aspects, the document history outline may reference the metadata associated with the document in order to access each event.

Presentation component 122 may generate a document history interface including one or more windows or panes for providing access to and information regarding a document. In further aspects, presentation component 122 may graphically render the document history outline to generate a document timeline corresponding to the document. A version of the document may be provided in one window, pane or area of the document history interface (e.g., first pane); the document timeline may be provided in another window, pane or area of the document history interface (e.g., second pane); and additional information regarding one or more events or groups of events associated with the document timeline may be provided in still other windows, panes or areas of the document history interface (e.g., third pane, fourth pane, etc.).

For example, presentation component 122 may generate all or a portion of a document timeline corresponding to a document lifecycle in a second pane of the document history interface. As used herein, a document lifecycle refers to a time period from a document creation time to a current time. The time period for a document lifecycle may be referred to herein as a document duration. In some aspects, the document timeline may be interactive. For example, the document timeline may include a scroll control for scrolling backwards and forwards along the document timeline. In embodiments, a position of the scroll control along the document timeline may determine the information provided in the other windows or panes. For instance, the version of the document as provided in the first pane may correspond to the document as it existed at the point in time during the document lifecycle that corresponds to the position of the scroll control. In further aspects, a play control may be provided for the document timeline such that, upon activation of the play control, a time-lapse rendition of events over the document lifecycle may be successively displayed.

The document timeline may further be tagged with one or more identifiers corresponding to various events or groups of events in temporal order. In some cases, the one or more identifiers may be icons or other graphical elements representative of different events or groups of events associated with the document. As described above, the document timeline may be interactive and, in addition to a scroll control and a play control, the one or more identifiers may be activated (e.g., by right or left clicking, hovering over, touching, swiping, gesturing, or otherwise) to provide additional information regarding the corresponding event or group of events. For example, the additional information may be provided in a third pane of the document history interface upon activation of an identifier and/or scrolling to a position associated with the identifier along the document timeline. In some cases, e.g., for different events occurring during substantially the same time period or for groups of events, additional information may be provided in multiple panes of the document history interface (e.g., third pane, fourth pane, etc.).

Providing additional information may further include providing an event timeline corresponding to a time period over which a corresponding group of events occurred. A time period over which the group of events occurred may be referred to herein as an event duration. In some aspects, the event timeline may replace the document timeline, for example, in the second pane. Alternatively, the event timeline may be provided in another pane of the document history interface, e.g., a third pane. Similar to a document timeline, an event timeline may also be tagged with one or more identifiers corresponding to one or more events within the group of events in temporal order. For example, an event timeline for an authoring session may include an identifier for each authoring event that occurred during the authoring session. In some aspects, as described above, the event timeline may include a scroll control for scrolling backwards and forwards along the event timeline. In embodiments, a position of the scroll control along the event timeline may determine the information provided in the other windows or panes. For instance, the version of the document as provided in the first pane may correspond to the document as it existed at the point in time during an authoring session that corresponds to the position of the scroll control. In further aspects, a play control may be provided for the event timeline and, in response to activation of the play control, a time-lapse rendition of authoring events occurring over an authoring session may be successively displayed.

Providing additional information may further include providing an event or details regarding an event in yet another pane of the document history interface. For example, providing additional information may include providing the corresponding email communication or conversation thread associated with a communication event, providing the related document corresponding to a branching event, providing a related document timeline associated with a branching event, providing a control for accessing a recording of a video conference associated with a communication event, providing a control for accessing a recording of an audio conference associated with a communication event, providing a calendar entry for a meeting associated with a communication event, and the like.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
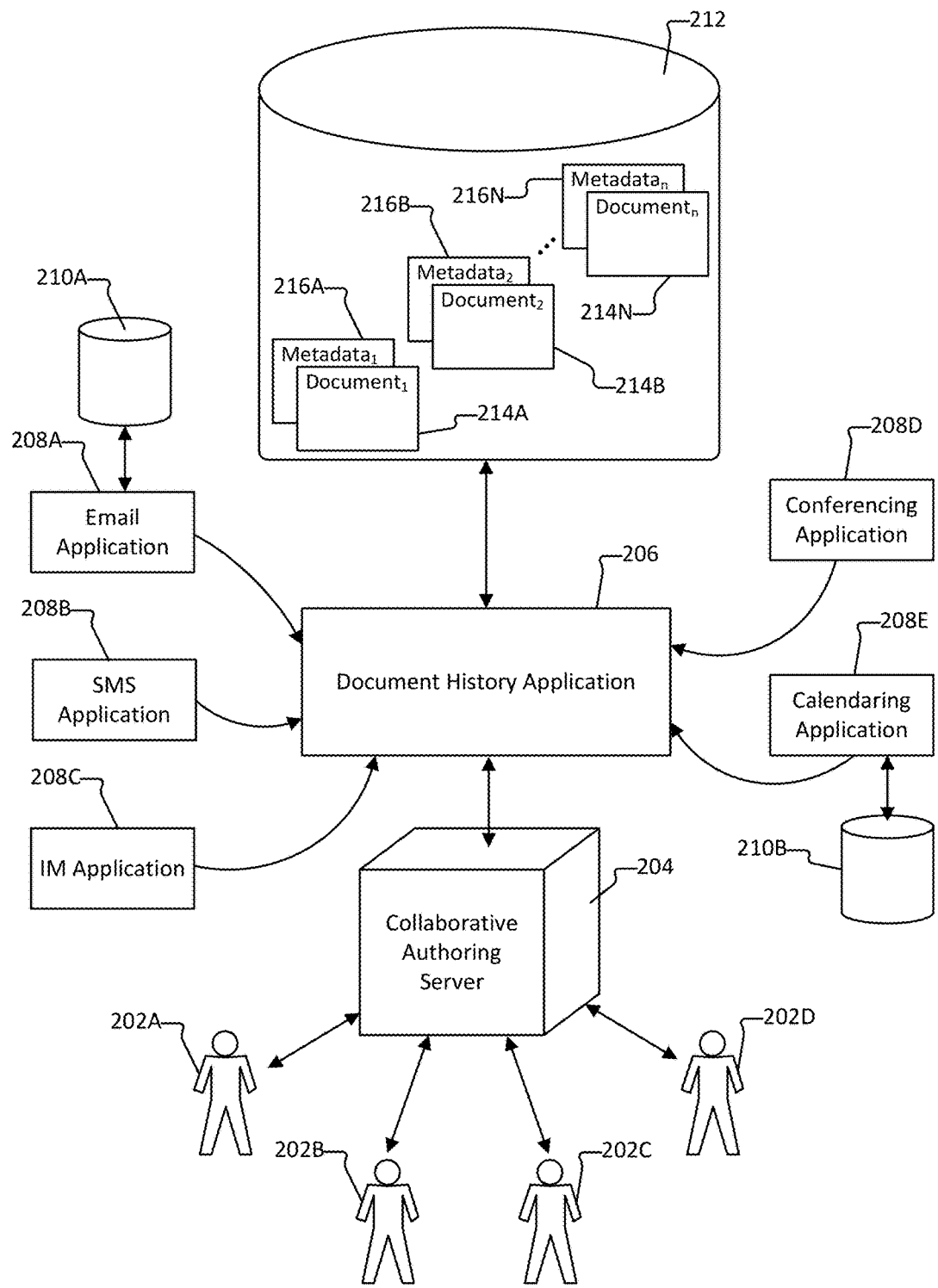
FIG. 2 illustrates an exemplary system for providing a document history interface, according to second embodiment.

FIG. 2 illustrates an exemplary system for providing a document history interface, according to second embodiment.

As illustrated, one or more users (e.g., user 202A, user 202B, user 202C, and user 202D) may access a collaborative authoring application, which may be executed on collaborative authoring server 204. As described above, the one or more users may access collaborative authoring server 204 via one or more client computing devices (not shown) over a network (not shown). As illustrated, aspects and functionalities described herein may operate over distributed systems (e.g., cloud-based computing systems), where application functionality, memory, data storage and retrieval and various processing functions may be operated remotely from each other over a distributed computing network, such as the Internet or an intranet. In this case, communications between entities over the distributed computing network are represented by arrows.

A collaborative authoring application enables a plurality of users (e.g., users 202A-202D) to coauthor a single document from multiple locations at substantially the same or similar time. In aspects, like authoring, "coauthoring" the document may include creating the document, viewing the document (e.g., read-only access), editing the document (e.g., write access for additions, deletions, formatting changes, and the like), and/or commenting in the document (e.g., via notations, comment bubbles, etc.) during an authoring session. As provided herein, coauthoring or authoring actions taken within a document correspond to "authoring events." The collaborative authoring application may further enable a user to create a second document from a first document. When the first document and the second document are related, creation of the second document corresponds to a branching event, as described above. Documents created and coauthored (e.g., document 214A, document 214B, document 214N, etc.) by multiple users may be stored in a storage location accessible to the collaborative authoring application and/or a document history application 206, e.g., storage 212.

The document history application 206 may be executed on or in communication with the collaborative authoring server 204. Document history application 206 may further be in communication with one or more communication applications. Communication applications include, but are not limited to, email application 208A, SMS application 208B, IM application 208C, conferencing application 208D, calendaring application 208E, and the like. As noted above, communication events may be received by the document history application 206 via the one or more communication applications. In some aspects, the communication events may be stored in storage locations accessible to each of the one or more communication applications, respectively, e.g., storage 210A associated with email application 208A and storage 210B associated with calendaring application 208E. Although not illustrated by FIG. 2, each of the communication applications may be associated with one or more storage locations. As provided above, communication events associated with a document include sharing the document (e.g., via email, IM, SMS, social feed, or other communication medium), discussing the document (e.g., via audio conference, video conference, IM, SMS, social feed, etc.), meeting regarding the document (e.g., a calendar event), presenting the document (e.g., within a presentation document or during a meeting), assigning tasks for the document (e.g., a task action), providing approvals for the document (e.g., manager approval action prior to publication or other dissemination of the document), and the like.

In response to receiving various events associated with a document, document history application 206 may link the various events to the document. For example, document history application 206 may link one or more authoring events, communication events, and/or branching events to the document. According to a first example, document history application 206 may create metadata referencing each event and may append the metadata to the document in order to link each event to the document (e.g., metadata 216A appended to document 214A, metadata 216B appended to document 216B, and metadata 216N appended to document 214N). As used herein, metadata may include any suitable identifier or reference for linking an event to a document, e.g., pointers, reference identifiers, hyperlinks, descriptors, etc. In a second example, document history application 206 may create metadata referencing an index of events associated with the document and may append the metadata to the document in order to link the indexed events to the document. As used herein, "appending" metadata to the document may involve linking the document to a separate metadata document (e.g., stored with the document or in another location, shown) or may involve writing the metadata directly to the document (e.g., in a field associated with the document, not shown).

The document history application 206 may further temporally collate one or more authoring events, communication events and/or branching events based on timestamps associated with each event. In some cases, document history application 206 may group certain events. For example, document history application 206 may group authoring events that occurred during an authoring session by a particular user. In a further example, document history application 206 may group communication events associated with a conversation thread. In some aspects, document history application 206 may create a document history outline for the document that is mapped to each event or group of events in temporal order. In further aspects, the document history outline may reference the metadata associated with the document in order to access each event.

Additionally, the document history application 206 may generate a document history interface including one or more windows or panes for providing information regarding a document. The document history interface may be accessible to a user upon launching the document history application 206 and/or the collaborative authoring application. Moreover, document history application 206 may graphically render of the document history outline to generate a document timeline corresponding to the document. For instance, a version of the document may be provided in one window, pane or area of the document history interface (e.g., first pane); the document timeline may be provided in another window, pane or area of the document history interface (e.g., second pane); and additional information regarding one or more events or groups of events associated with the document timeline may be provided in yet other windows, panes or areas of the document history interface (e.g., third pane, fourth pane, etc.).

In some aspects, the document timeline may be interactive and may include a scroll control for scrolling backwards and forwards along the document timeline. In embodiments, a position of the scroll control along the document timeline may determine the information provided in the other windows or panes. For instance, the version of the document as provided in the first pane may correspond to the document as it existed at the point in time corresponding to the position of the scroll control. A play control may also be provided for the document timeline such that, upon activation of the play control, a time-lapse rendition of the document timeline may be provided. In still other aspects, one or more identifiers representing one or more events or groups of events may be activated to provide additional information regarding the one or more events or groups of events.

As should be appreciated, the various devices, components, etc., described with respect to FIG. 2 are not intended to limit the systems and methods to the particular components described. Accordingly, additional topology configurations may be used to practice the methods and systems herein and/or some components described may be excluded without departing from the methods and systems disclosed herein.

Figure 3:
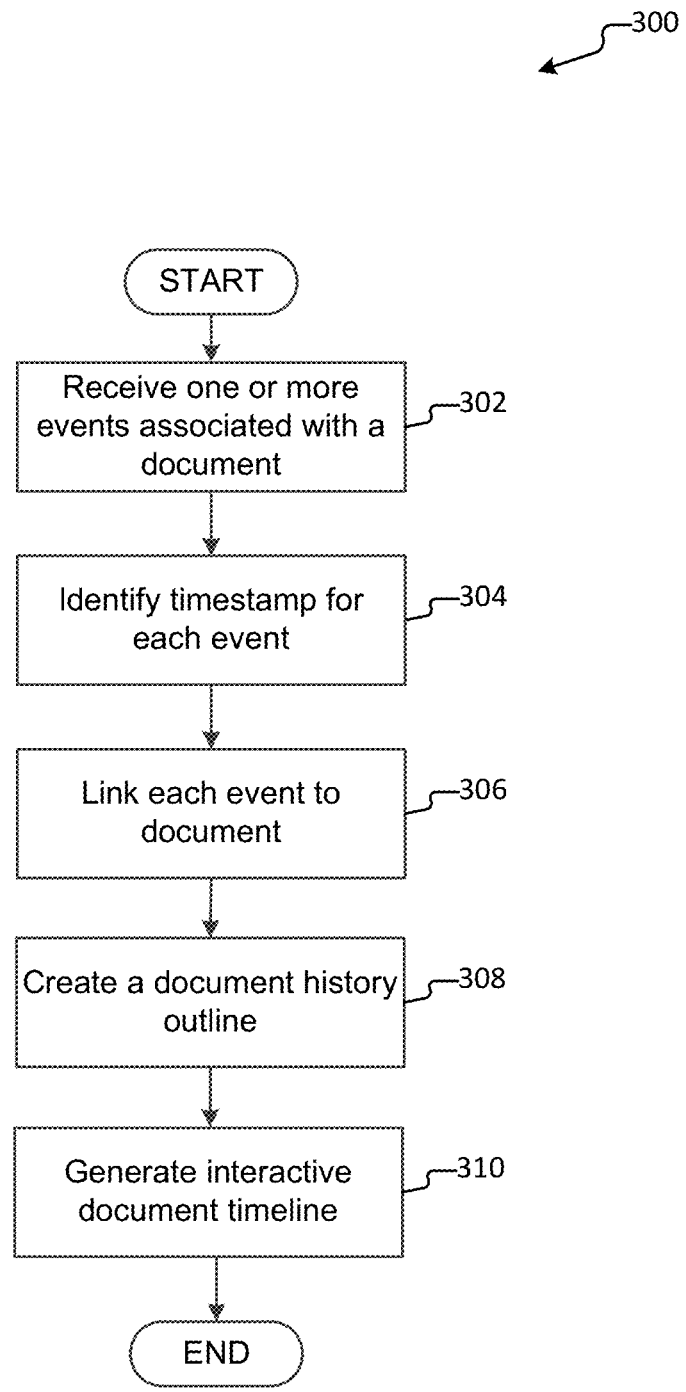
FIG. 3 illustrates an exemplary method for graphically rendering an interactive document timeline, according to an example embodiment.

FIG. 3 illustrates an exemplary method for graphically rendering an interactive document timeline, according to an example embodiment.

Method 300 begins with receive operation 302, where one or more events associated with a document are received by a document history application (e.g., document history application 110 or document history application 206). In some aspects, the one or more events may be received by one or more components of the document history application (e.g., document tracker 112, communication tracker 114, and branching tracker 116). The one or more events may include one or more authoring events (e.g., actions received from a word processing application or from a collaborative authoring application), communication events (e.g., received via an email application, calendaring application, tasking application, instant messaging application, video conferencing application, audio conferencing application, etc.), branching events (e.g., related document creation actions received from a word processing application or received from a collaborative authoring application), and the like. As should be appreciated, other events associated with a document are conceivable and the listing of events above is exemplary only and is not intended to be exhaustive and/or otherwise limiting.

At identify operation 304, a timestamp for each of the one or more events is identified. In aspects, the timestamp for each event corresponds to the point in time that the event occurred. For example, a timestamp may include a calendar date (e.g., YYYY/MM/DD), an hour designation (in 12 hour or 24 hour format), a minute designation, a second designation, a decisecond designation, and the like.

At link operation 306, each of the one or more events may be linked to the document. For example, a component of the document history application (e.g., linker component 118) may link one or more authoring events, communication events, and/or branching events to the document. As described above, according a first example, metadata referencing each event may be appended to the document in order to link each event to the document. In a second example, metadata referencing an index of events may be appended to the document in order to link the indexed events to the document. In a third example, metadata referencing events that are accessible via another application (e.g., a communication application) may be appended to the document. In some cases, the appended metadata may further specify or reference the timestamp for each event.

At create operation 308, a document history outline may be created. In aspects, a component of the document history application may create the document history outline (e.g., temporal synchronizer 120). For example, the one or more events (e.g., authoring events, communication events and/or branching events) may be temporally collated based on the timestamp associated with each event. In some cases, certain events may be grouped, e.g., authoring events that occurred during an authoring session for a particular user, communication events associated with a conversation thread, etc. The document history outline may be created for the document by mapping each event or group of events in temporal order. In some aspects, the document history outline may reference metadata associated with the document in order to link each event to the document timeline.

At generate operation 310, an interactive document timeline may be generated. For instance, a document history application may generate a document history interface including one or more windows or panes for providing information regarding a document. Further, a component of the document history application may graphically render the document history outline to generate the document timeline (e.g., presentation component 122). In aspects, a version of the document may be provided in a first pane of the document history interface, the graphical rendering of the document timeline may be provided in a second pane of the document history interface, and additional information regarding one or more events or groups of events may be provided in a third pane of the document history interface. Alternatively, any suitable number of panes or windows may be displayed in the document history interface for providing one or more versions of the document, the document timeline, and/or additional information associated with one or more events.

In aspects, the document timeline corresponds to a document lifecycle, which begins at a document creation time and continues to a current time. In further aspects, the document timeline may be interactive. For example, the document timeline may include a scroll control for scrolling backwards and forwards along the document timeline. In embodiments, a position of the scroll control along the document timeline may determine the information provided in the other windows or panes. For instance, the version of the document as provided in the first pane may correspond to the document as it existed at the point in time during the document lifecycle that corresponds to the position of the scroll control along the document timeline. In further aspects, a play control may be provided for the document timeline such that, upon activation of the play control, a time-lapse rendition of events over the document lifecycle may be successively displayed.

The document timeline may further be tagged with one or more identifiers corresponding to various events or groups of events in temporal order. In some cases, the one or more identifiers may be icons or other graphical elements representative of different events or groups of events associated with the document. As described above, the document timeline may be interactive and, in addition to a scroll control and play control, the one or more identifiers may be activated (e.g., by right or left clicking, hovering over, touching, swiping, gesturing, or otherwise) to provide additional information regarding the corresponding event or group of events. For example, the additional information may be provided in a third pane of the document history interface upon activation of an identifier and/or scrolling to a position associated with the identifier along the document timeline. In some cases, e.g., for different events occurring during substantially the same time period or for groups of events, additional information may be provided in multiple panes of the document history interface (e.g., third pane, fourth pane, etc.).

As should be appreciated, operations 302-310 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
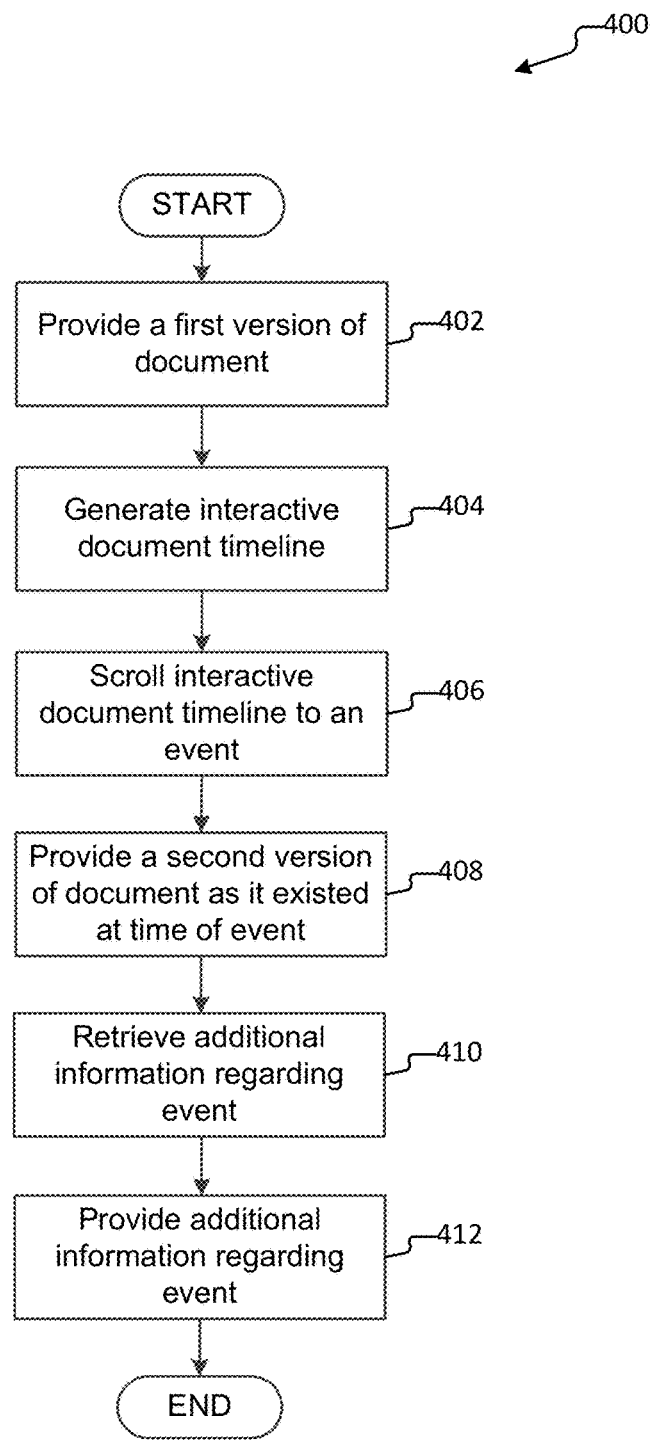
FIG. 4 illustrates an exemplary method for scrolling an interactive document timeline, according to an example embodiment.

FIG. 4 illustrates an exemplary method for scrolling an interactive document timeline, according to an example embodiment.

Method 400 begins with provide operation 402, where a first version of a document is provided. As detailed above, a document history application may generate a document history interface that includes one or more panes for providing a document and information associated with the document. For example, a first version of the document may be provided in a first pane of the document history interface.

At generate operation 404, an interactive document timeline corresponding to a document lifecycle for the document may be generated. For example, a component of the document history application (e.g., presentation component 122) may graphically render a document history outline to generate an interactive document timeline. In aspects, the interactive document timeline may include a scroll control (e.g., for scrolling backwards and forwards along the document timeline), a play control (e.g., for successively displaying a time lapse of one or more events in a document lifecycle), and/or one or more identifiers corresponding to one or more events (e.g., upon activation, an identifier may cause additional information regarding a corresponding event or group of events to be provided).

At scroll operation 406, a selection to scroll along the interactive document timeline may be received. As described above, scrolling along the interactive document timeline enables a user to visualize one or more events that occurred during the document lifecycle. For instance, the scroll control may be scrolled to an identifier along the interactive document timeline that corresponds to an event or a group of events occurring at a particular time within the document lifecycle. As provided above, events may include authoring events (e.g., actions received from a word processing application or from a collaborative authoring application), communication events (e.g., received via an email application, calendaring application, tasking application, instant messaging application, video conferencing application, audio conferencing application, etc.), branching events (e.g., related document creation actions received from a word processing application or received from a collaborative authoring application), and the like. In response to scrolling to the identifier, the identifier may be activated to cause additional information regarding the corresponding event to be provided in one or more panes of the document history interface, as further detailed below.

At provide operation 408, a second version of the document may be provided in a pane of the document history interface. In some aspects, the second version of the document may replace the first version of the document in the first pane of the document history interface. In other aspects, the second version of the document may be provided in another pane of the document history interface. As described above, the version of the document as provided in the first pane may correspond to the document as it existed at the point in time during the document lifecycle that corresponds to the position of the scroll control. In this case, in response to scrolling to the identifier corresponding to the event, the second version of the document that is provided may correspond to the document as it existed at the particular time of the event.

At retrieve operation 410, additional information regarding the event may be retrieved. As provided above, in response to scrolling to the identifier, the identifier may be activated to cause additional information regarding the corresponding event to be provided in one or more panes of the document history interface. In some cases, the additional information may be retrieved from the document history application, e.g., additional information regarding an authoring event or a branching event. In other cases, the additional information may be retrieved from another application, e.g., a communication application regarding a communication event.

Communication applications include, but are not limited to, email applications, SMS applications, IM applications, conferencing applications (audio and/or video), calendaring applications, tasking applications, and the like. In this regard, communication events may be stored in storage locations that are accessible to each of the communication applications, respectively. Accordingly, additional information regarding different communication events may be retrieved from different storage locations accessible to different communication applications. In at least some aspects, the different storage locations may not be accessible to the document history application and are retrieved via the associated communication application. For example, additional information regarding a document share event may be retrieved from an email application, SMS application, etc.; additional information regarding a conferencing event may be retrieved from an audio and/or video conferencing application; additional information regarding a task event may be retrieved from a task application; additional information regarding a meeting event may be retrieved from a calendaring application; etc.

At provide operation 412, additional information regarding the event associated with an identifier at the position of the scroll control may be provided. In some aspects, e.g., if the identifier represents a group of events, providing additional information may include providing an event timeline corresponding to a time period over which a corresponding group of events occurred. For example, the event timeline may correspond to an authoring session during which a group of authoring events were received. The event timeline may be provided in a third pane of the document history interface; alternatively, the event timeline may replace the interactive document timeline in a second pane of the document history interface; alternatively still, the event timeline may be provided in another window, pane or area of the document history interface. In other aspects, providing additional information for a group of events may include providing the corresponding conversation thread associated with a group of communication events. The conversation thread may be provided in a third pane of the document history interface, or in another window, pane or area of the interface.

In other aspects, e.g., if the identifier represents a single event, providing additional information may include providing the event or details regarding an event. In this case, providing additional information may include providing an email communication corresponding to a communication event, providing a related document corresponding to a branching event, providing a related document timeline associated with a branching event, providing a control for accessing a recording of a video conference associated with a communication event, providing a control for accessing a recording of an audio conference associated with a communication event, providing a calendar entry for a meeting associated with a communication event, and the like. The additional information may be provided in a third pane of the document history interface, or in one or more other windows, panes or areas of the interface.

Figure 5:
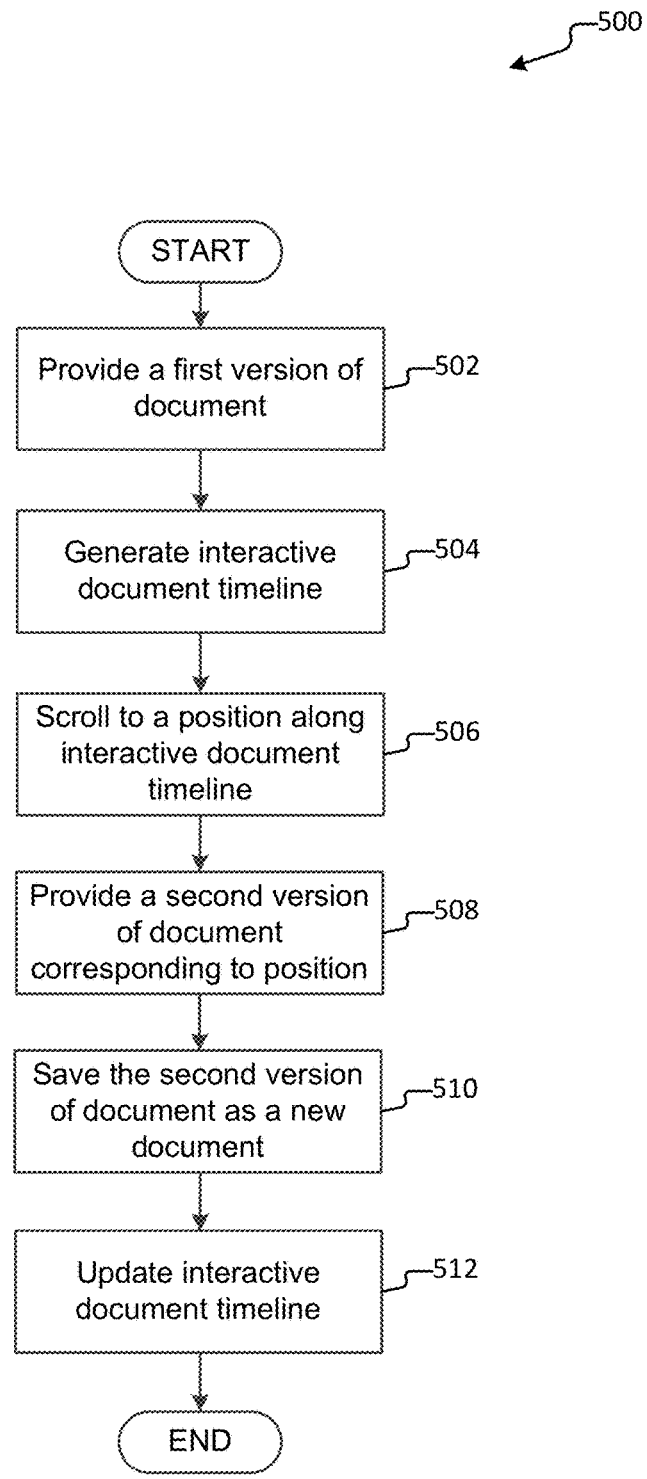
FIG. 5 illustrates an exemplary method for saving a second version of a document as a new document, according to an example embodiment.

As should be appreciated, operations 402-412 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIG. 5 illustrates an exemplary method for saving a second version of a document as a new document, according to an example embodiment.

Method 500 begins with provide operation 502, where a first version of a document is provided. As detailed above with respect to operation 402, a document history application may generate a document history interface that includes one or more panes for providing a document and information associated with the document. For example, a first version of the document may be provided in a first pane of the document history interface.

At generate operation 504, an interactive document timeline corresponding to a document lifecycle for the document may be generated. As detailed above with respect to operation 404, the interactive document timeline may include a scroll control (e.g., for scrolling backwards and forwards along the document timeline), a play control (e.g., for successively providing a time lapse of one or more events in a document lifecycle), and/or one or more identifiers corresponding to one or more events (e.g., upon activation an identifier may cause additional information regarding a corresponding event or group of events to be provided).

At scroll operation 506, a selection to scroll along the interactive document timeline may be received. As described above with respect to operation 406, a scroll control may allow for scrolling backwards and forwards along the interactive document timeline. In aspects, the scroll control may be scrolled to a position along the interactive document timeline that corresponds to a particular time within the document lifecycle.

At provide operation 508, a second version of the document may be provided in a pane of the document history interface. In some aspects, the second version of the document may replace the first version of the document in the first pane of the document history interface. In other aspects, the second version of the document may be provided in another pane of the document history interface. As described above, the version of the document as provided in the first pane may correspond to the document as it existed at the point in time during the document lifecycle that corresponds to the position of the scroll control.

At save operation 510, the second version of the document may be saved as a new document. As detailed above, the document history application enables users to create a new document based on a legacy version of a document. That is, a user may create a second document (e.g., new document) by saving a version of a first document as it existed at a prior point in time during a document lifecycle. For example, in response to scrolling back to a position along an interactive document timeline for the document, a version of the document may be provided as it existed at a prior point in time corresponding to the position. In the present example, the version provided may be a second version of the document, as detailed above. In aspects, when the second version of the document is provided, a save control may be provided within or near the pane in which the second version is provided. In response to activating the save control, the second version of the document may be saved as a new document.

Thus, the present methods enable a user not only to view a legacy version of a document as it existed at a prior point in time, but also to save that legacy version as a new document. As should be appreciated, when changes are made and saved to a document using a traditional word processing or collaborative authoring application, a previous version (legacy version) of the document is replaced with a current version of the document. In fact, unless the user saved the legacy version as a separate version prior to making and saving the changes into the current version, the legacy version of the document is overwritten and is not retrievable thereafter by the word processing application. In contrast, in the present case, where a legacy version of a document was not actively saved by the user, the legacy version may later be provided by scrolling backwards along an interactive document timeline. According to aspects, a legacy version of the document may be provided as the document existed at any point in time over the lifecycle of the document. Thus, a plurality of legacy versions of the document may be provided corresponding to the document as it existed at a plurality of points in time over the lifecycle of the document. For example, a legacy version of the document may be provided as it existed at the time of an previous event (e.g., a communication event such as a meeting) and later saved as a new document. As should be understood, any of the plurality of legacy versions of the document may later be provided and saved as new documents.

At update operation 512, the interactive document timeline may be updated. For example, the interactive document timeline may be updated with a branching event. In aspects, the branching event may be represented by an identifier (e.g., icon) at the time in which the branching event occurred along the updated interactive document timeline. As described above, a branching event occurs when a new document (e.g., second document) is created that is based on and related to a version of a document (e.g., first document). According to some aspects, when a new document is created from a version of a document, a document tree is created. For example, each document in a document tree may be represented by a branch of the document tree, with the first document in a primary branch position and each subsequent document (e.g., new document) in a secondary, a tertiary, etc., branch position within a hierarchical structure of the document tree. In further aspects, each branch of the document tree may be related temporally such that as each new document is created, a document creation time is associated with the point in time that the corresponding branch splits off of the document tree. Thus, each branch of the document tree may be related hierarchically and temporally to the other branches in the document tree whereby higher (e.g., primary) branch positions correspond to earlier document creation times and lower (e.g., secondary, tertiary, etc.) branch positions correspond to later document creation times. According to aspects, after a branch splits off, temporal events corresponding to the first document and the second document may be represented by parallel document timelines along a concurrent time scale.

As should be appreciated, operations 502-512 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 6:
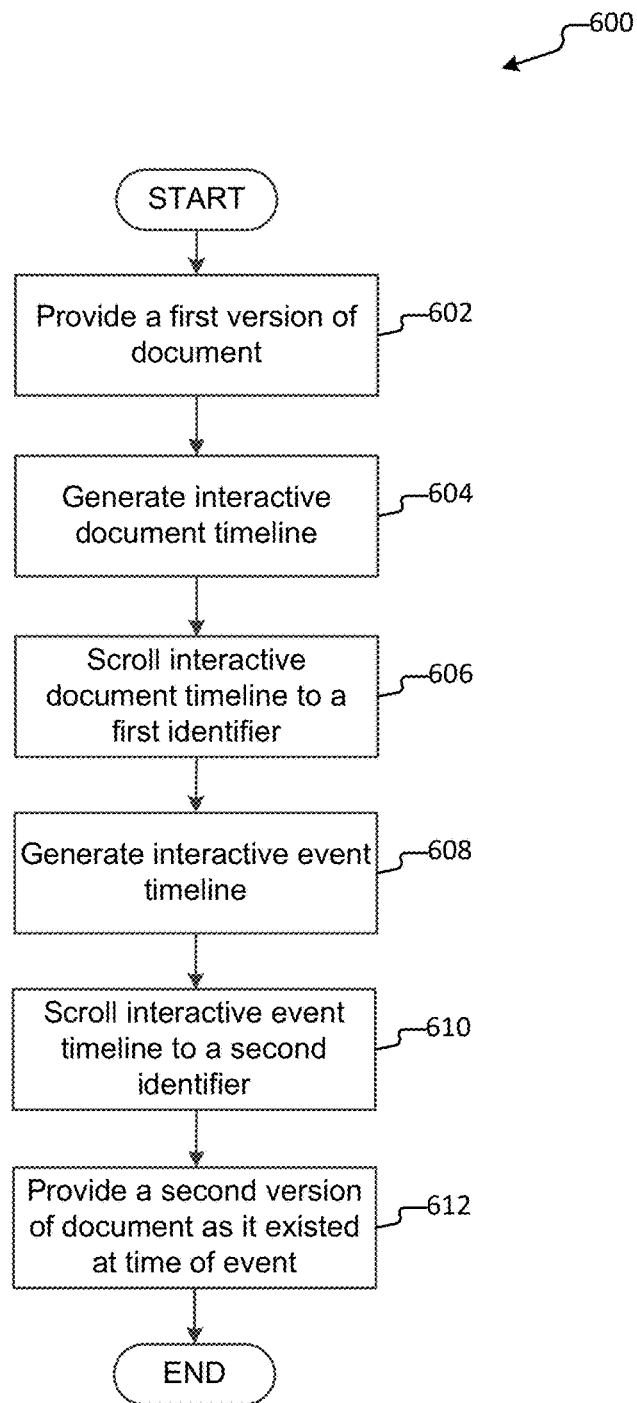
FIG. 6 illustrates an exemplary method for scrolling an interactive event timeline, according to an example embodiment.

FIG. 6 illustrates an exemplary method for scrolling an interactive event timeline, according to an example embodiment.

Method 600 begins with provide operation 602, where a first version of a document is provided. As detailed above with respect to operations 402 and 502, a document history application may generate a document history interface that includes one or more panes for providing a document and information associated with the document. For example, a first version of the document may be provided in a first pane of the document history interface.

At generate operation 604, an interactive document timeline may be generated. For example, as described above with respect to operations 404 and 504, a component of the document history application (e.g., presentation component 122) may graphically render a document history outline to generate an interactive document timeline. In aspects, the interactive document timeline may include a scroll control (e.g., for scrolling backwards and forwards along the document timeline), a play control (e.g., for successively displaying a time lapse of one or more events in a document lifecycle), and/or one or more identifiers corresponding to one or more events (e.g., upon activation an identifier may cause additional information regarding a corresponding event or group of events to be provided).

At scroll operation 606, a selection to scroll along the interactive document timeline may be received. As described above with respect to operations 406 and 506, a scroll control may allow for scrolling backwards and forwards along the interactive document timeline. In aspects, scrolling along the interactive document timeline enables a user to visualize one or more events that occurred during a document lifecycle. In some cases, the scroll control may be scrolled to an identifier along the interactive document timeline that corresponds to a single event that occurred during the document lifecycle. In other cases, the scroll control may be scrolled to an identifier (e.g., a first identifier) corresponding to a group of events (e.g., a plurality of authoring events associated with an authoring session) that occurred during the document lifecycle.

At generate operation 608, an interactive event timeline corresponding to the group of events may be generated. In some aspects, operation 604 and operation 606 may be skipped and operation 608 may generate an interactive event timeline upon providing the first version of the document. The interactive event timeline may correspond to an authoring session during which a plurality of authoring events were received. In aspects, the interactive event timeline may be provided in a third pane of the document history interface; alternatively, the interactive event timeline may replace the interactive document timeline in a second pane of the document history interface; alternatively still, the interactive event timeline may be provided in another window, pane or area of the document history interface. In further aspects, the interactive event timeline may include a scroll control (e.g., for scrolling backwards and forwards along the interactive event timeline), a play control (e.g., for successively displaying a time lapse of one or more events in a document lifecycle), and/or identifiers corresponding to each event of the group of events (e.g., upon activation, an identifier may cause additional information regarding a corresponding event to be provided). In some aspects, an identifier for an event (e.g., authoring event) within a group of events (e.g., authoring session) may comprise an icon, a hash mark, a peak within a waveform, and the like.

At scroll operation 610, a selection to scroll along the interactive event timeline may be received. As described above, a scroll control may allow for scrolling backwards and forwards along the interactive event timeline. For example, scrolling along the interactive event timeline may enable a user to visualize one or more authoring events that occurred during an authoring session. In some cases, the scroll control may be scrolled to an identifier (e.g., second identifier) along the interactive event timeline that corresponds to an authoring event occurring at a particular time during the authoring session. In other cases, the scroll control may be scrolled to a position along the interactive event timeline that corresponds to a particular time during the authoring session.

At provide operation 612, a second version of the document may be provided in a pane of the document history interface. In some aspects, the second version of the document may replace the first version of the document in the first pane of the document history interface. In other aspects, the second version of the document may be provided in another pane of the document history interface. As described above, the version of the document as provided in the first pane may correspond to the document as it existed at the point in time during authoring session that corresponds to the second identifier along the interactive event timeline.

As should be appreciated, operations 602-612 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7:
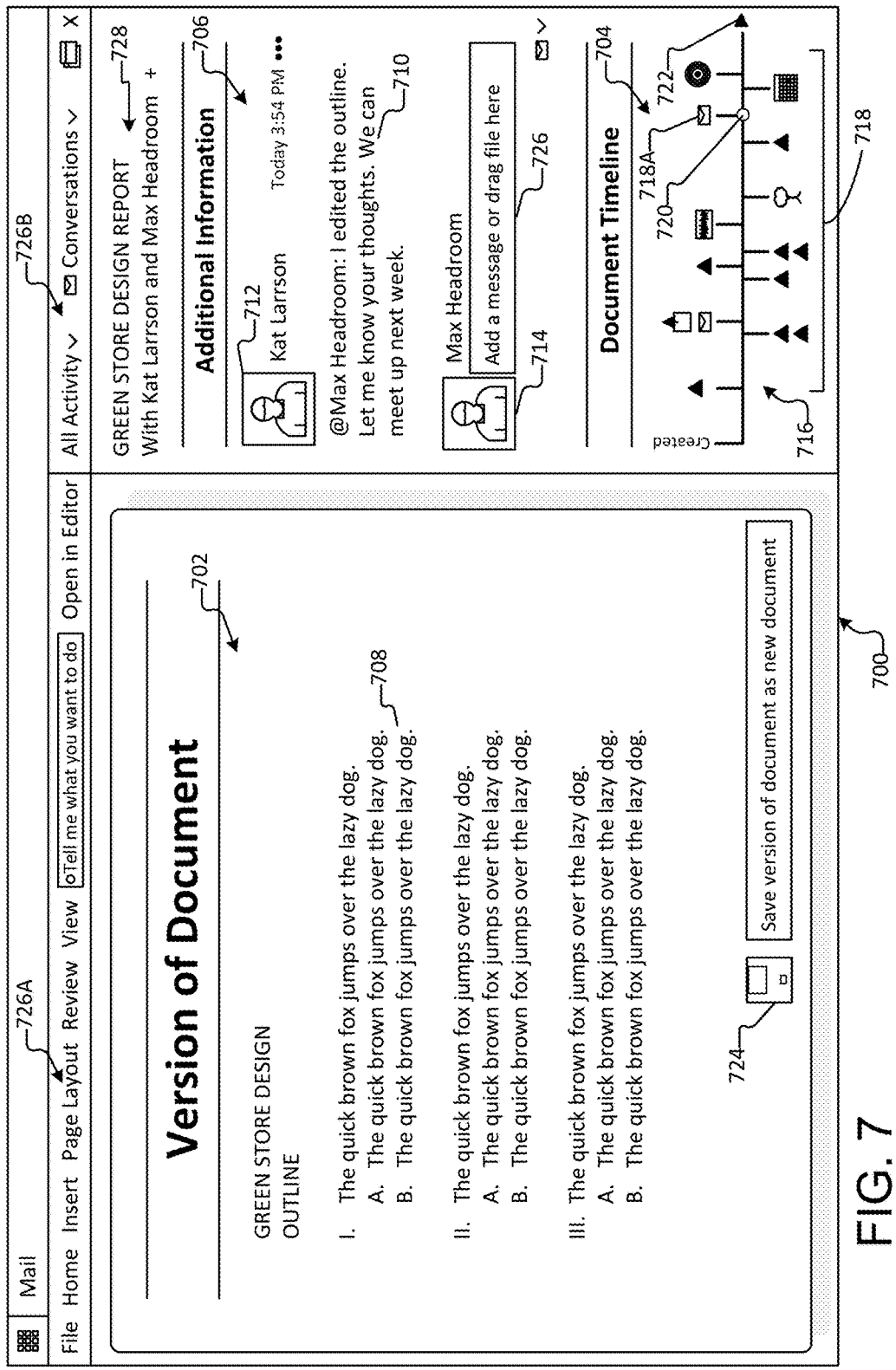
FIG. 7 illustrates an exemplary document history interface, according to an example embodiment.

FIG. 7 illustrates an exemplary document history interface, according to an example embodiment.

As detailed above, the document history application (e.g., document history application 110 or document history application 206) may generate a document history interface (e.g., document history interface 700) for accessing one or more versions of one or more documents, one or more interactive document timelines, one or more interactive event timelines, additional information regarding the one or more documents and/or one or more events associated with the documents, etc. In some aspects, as detailed above, the document history interface 700 may provide one or more windows, panes or areas for presenting the various document versions, interactive timelines, and additional information. As illustrated, document history interface 700 includes a first pane 702, a second pane 704, and a third pane 706.

As further illustrated by FIG. 7, document history interface 700 may include one or more toolbars including authoring controls for interacting with the document (e.g., toolbar 726A) and/or controls for accessing other applications and information (e.g., toolbar 726B). Additionally, document history interface 700 may include one or more ribbons for providing context information (e.g., ribbon 728). As should be appreciated, the illustrated toolbars and/or ribbons are exemplary only and any number of toolbars, ribbons, and the like, may be provided in document history interface 700 to enhance a user experience.

As provided above, the document history application may be incorporated into or in communication with a word processing application and/or collaborative authoring application. In aspects, first pane 702 may provide access to a version of a document for authoring the document. In further aspects, the version of the document may include content 708. Authoring the document may include performing authoring actions such as adding content, deleting content, changing content, adding formatting, changing formatting, adding comments, deleting comments, changing comments, and the like. In aspects, toolbar 726A may include one or more authoring controls for performing the authoring actions in the version of the document. As illustrated, the first pane 702 may further include a save control 724 for saving the version of the document as a new document.

As further illustrated, second pane 704 may provide a document timeline 716. Document timeline 716 may be a graphical rendering of a document history outline associated with a document lifecycle. As used herein, a document lifecycle refers to a time period from a document creation time to a current time. In some aspects, the document timeline may be interactive. For example, the document timeline may include a scroll control 720 for scrolling backwards and forwards along the document timeline 716. In embodiments, a position of the scroll control 720 along the document timeline 716 may determine the information provided in the other windows or panes. For instance, the version of the document as provided in the first pane 702 may correspond to the document as it existed at the point in time during the document lifecycle that corresponds to the position of the scroll control 720. In further aspects, a play control 722 may be provided for the document timeline 716 such that, upon activation of the play control 722, a time-lapse rendition of events over the document lifecycle may be successively displayed.

The document timeline 716 may further be tagged with one or more identifiers 718 corresponding to various events or groups of events in temporal order. In some cases, the one or more identifiers may be icons or other graphical elements representative of different events or groups of events associated with the document. As described above, the document timeline may be interactive and, in addition to a scroll control and play control, the one or more identifiers may be activated (e.g., by right or left clicking, hovering over, touching, swiping, gesturing, or otherwise) to provide additional information regarding the corresponding event or group of events. For instance, additional information may be provided in third pane 706 of the document history interface 700 upon activation of an identifier and/or scrolling to a position along the document timeline 716. In some cases, e.g., for different events occurring during substantially the same time period or for groups of events, additional information may be provided in multiple panes of the document history interface (e.g., third pane, fourth pane, etc.) (not shown).

As illustrated, scroll control 720 has been scrolled to an identifier 718A corresponding to a communication event (e.g., a communication). As further illustrated, the additional information provided in third pane 706 includes the communication 710 from user 712 to user 714 that was sent at the point in time corresponding to the position of scroll control 720 along document timeline 716. As shown, communication 710 may represent an email communication, instant message (IM) communication, chat communication, SMS communication, etc. In some aspects, when the communication 710 is provided in third pane 706 (e.g., when scroll control 720 has been scrolled to the position of identifier 718A along the document timeline 716), user 714 may reply to communication 710 via entry field 726. Further, the version of the document provided in the first pane 702 corresponds to the document as it existed at the point in time of the communication event (e.g., communication 710) corresponding to the position of identifier 718A along document timeline 716.

As should be appreciated, the various features and functionalities of document history interface 700 described with respect to FIG. 7 are not intended to limit associated systems and methods to the particular features and functionalities described. Accordingly, additional features and functionalities may be associated with the systems and methods described herein and/or some features and functionalities described may be excluded without departing from the systems and methods described herein.

Figure 8:
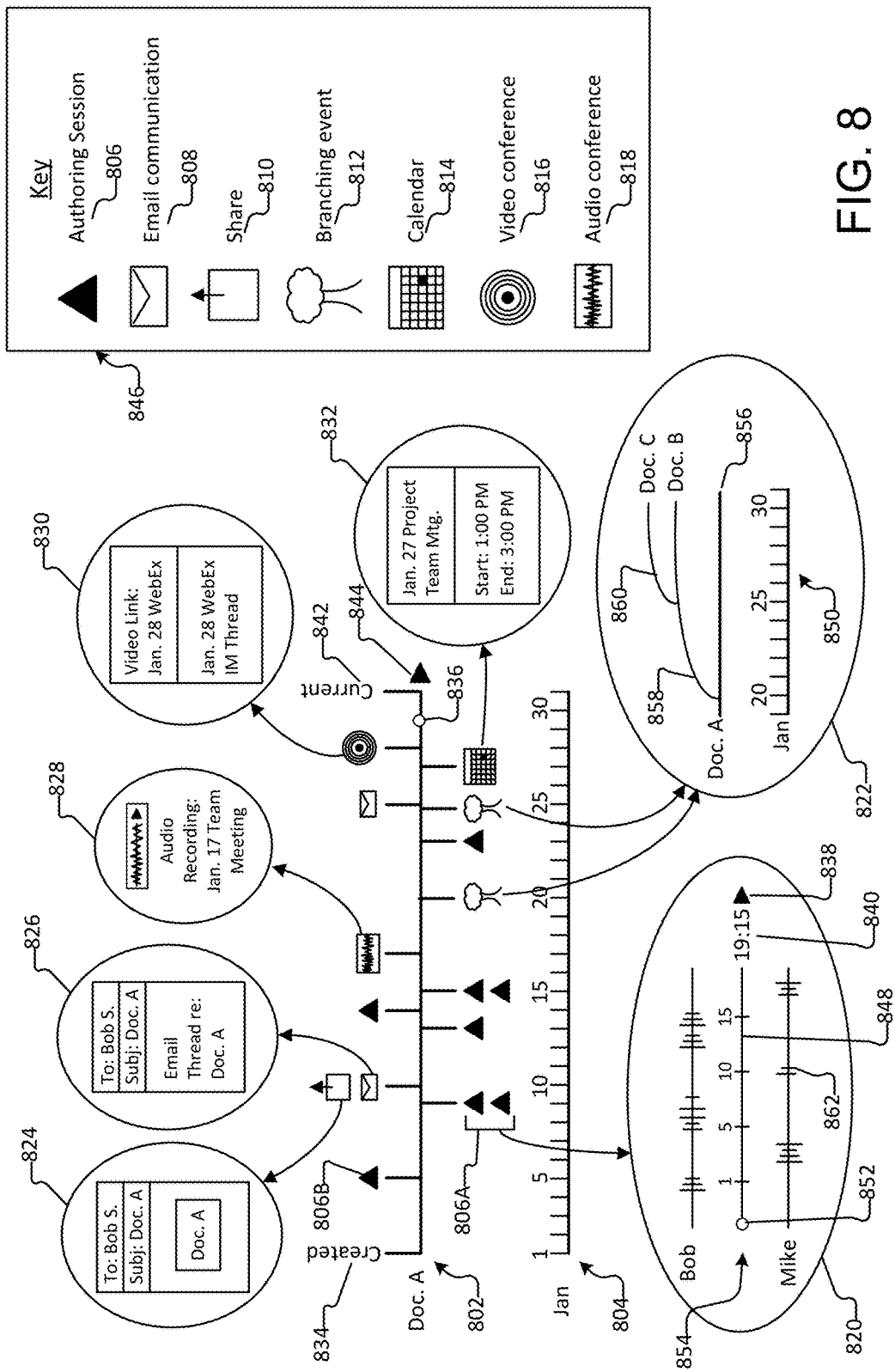
FIG. 8 illustrates an exemplary document timeline, according to an example embodiment.

FIG. 8 illustrates an exemplary document timeline, according to an example embodiment.

As detailed above, the document history application may generate a graphical rendering of a document history outline to provide a document timeline (e.g., document timeline 802) associated with a lifecycle of a document (e.g., Doc. A). A document lifecycle refers to a time period from a document creation time 834 to a current time 842. The time period for the document lifecycle may be referred to herein as the document duration. In further aspects, the document timeline 802 may be associated with a time scale 804, which displays appropriate increments of time based on the document duration. For instance, as illustrated, the document duration is thirty-one days. Accordingly, time scale 804 displays time increments in days, from January 1 to January 31. Alternatively, for a document duration of a year, time scale 804 may display time increments in months; for a document duration of a day, time scale 804 may display time increments in hours; and for a document duration of a few hours, time scale 804 may display time increments in minutes. As should be appreciated, the document history application may determine appropriate increments of time based on the document duration and may provide such appropriate increments on time scale 804.

The document timeline 802 may be interactive. For example, the document timeline 802 may include a scroll control 836 for scrolling backwards and forwards along the document timeline 802. In embodiments, a position of the scroll control 836 along the document timeline 802 may determine the information provided in windows or panes of a document history interface (not shown). In further aspects, a play control 844 may be provided for the document timeline 802. Upon activation of the play control 844, a time-lapse rendition of events over the document lifecycle may be successively displayed.

The document timeline 802 may further be tagged with one or more identifiers corresponding to various events or groups of events in a temporal order along the document timeline 802. In some cases, the one or more identifiers may be icons or other graphical elements representative of different events or groups of events associated with the document. For instance, as illustrated by key 846, an authoring session may be represented by a delta icon 806, an email communication may be represented by an envelope icon 808, a document share event may be represented by a share icon 810, a branching event (e.g., upon creation of a new document) may be represented by a tree icon 812, a meeting event may be represented by a calendar icon 814, a video conference event may be represented by a broadcast icon 816, and an audio conference may be represented by a an audio icon 818. As should be appreciated, the illustration and listing of various events and associated icons is provided for exemplary purposes only and other types of events may be provided, represented by other icons or graphical elements, without departing from the present disclosure.

As described above, the document timeline may be interactive and, in addition to a scroll control and play control, the one or more identifiers may be activated (e.g., by right or left clicking, hovering over, touching, swiping, gesturing, or otherwise) to provide additional information regarding the corresponding event or group of events. For instance, additional information may be provided one or more windows or panes of a document history interface (not shown) upon activation of an identifier and/or scrolling to a position along the document timeline 802.

In some cases, multiple events or groups of events may occur at substantially the same time along the document timeline 802. For instance, as illustrated by view 820, in response to activating dual delta icons 806A and/or scrolling scroll control 836 to a position along the document timeline 802 corresponding to the dual delta icons (not shown), additional information regarding two concurrent authoring sessions may be provided (e.g., coauthoring). View 820 shows an authoring session conducted by Bob (e.g., first user) and an authoring session conducted by Mike (e.g., second user) displayed concurrently with an event timeline 854. Event timeline 854 is provided with a time scale 848, which displays appropriate time increments in minutes for event duration 840 of nineteen minutes and 15 seconds (i.e., 19:15; or, if hours are represented, 00:19:15). In aspects, event timeline 854 may be interactive, including a scroll control 852 for scrolling backwards and forwards along the event timeline 854. In embodiments, a position of the scroll control 852 along the event timeline 854 may determine the information provided in windows or panes of a document history interface (not shown). In further aspects, a play control 838 may be provided for the event timeline 854 such that, upon activation of the play control 838, a time-lapse rendition of events over the concurrent authoring sessions may be successively displayed. In this case, a time-lapse rendition of events may be merged into a single display of successive events (e.g., in a single window or pane), or a time-lapse rendition of successive events from each authoring session may be separately displayed (e.g., in separate windows or panes).

Each concurrent authoring session is further tagged with one or more identifiers 862 (e.g., hash marks) representing one or more authoring events received during the concurrent authoring sessions. As should be appreciated, a similar event timeline may be provided for a single authoring session (e.g., as represented by single delta icon 806B). In one example of a single authoring session, identifiers (e.g., hash marks) corresponding to authoring events may be displayed along the event timeline and a time scale may be provided adjacent to the event timeline. In another example of a single authoring session, a single authoring session may be displayed adjacent to the event timeline, with the event timeline including a time scale (similar to view 820).

As illustrated by view 822, upon activating a tree icon 812 and/or scrolling scroll control 836 to a position along the document timeline 802 corresponding to a tree icon 812 (not shown), additional information regarding one or more branching events may be provided. In the illustrated example, activation of any of the one or more tree icons 812 may provide the same additional information regarding the one or more branching events, as shown in view 822. For example, document timelines representing multiple related documents may be provided adjacent to a time scale 850. As detailed above, time scale 850 may display appropriate time increments based on the time period over which the branching events occurred, in this case in days between January 19 and January 31. As illustrated, a first document timeline 856 corresponding to a first document (e.g., original document, Doc. A) is provided as a base timeline, a second document timeline 858 corresponding to a second document (e.g., derivative document, Doc. B) splits off at a first time (e.g., January 20), and a third document timeline 860 corresponding to a third document (e.g., derivative document, Doc. C) splits off at a second time (e.g., January 25).

In this example, Doc. C is a derivative document of Doc. B, which is a derivative document of original document Doc. A. It should be appreciated that any number of different relationships between documents are possible, e.g., Doc. C may rather split off of the first document timeline and be a direct derivative of Doc. A. Indeed, branching events may be illustrated based on the temporal and hierarchical relationship between documents depending on when new documents were created and the documents from which the new documents were created. While not shown, each of the document timelines (e.g., first document timeline, second document timeline, third document timeline) may further be illustrated with a scroll control, play control, and/or one or more identifiers representing events occurring over each document's lifecycle, as detailed with respect to document timeline 802.

As illustrated by view 824, upon activating a share icon 810 and/or scrolling scroll control 836 to a position along the document timeline 802 corresponding to a share icon 810 (not shown), additional information regarding a first communication event may be provided. For example, an email communication to which Doc. A was attached may be displayed.

As illustrated by view 826, upon activating an envelope icon 808 and/or scrolling scroll control 836 to a position along the document timeline 802 corresponding to an envelope icon 808 (not shown), additional information regarding a second communication event may be provided. For example, a conversation thread regarding Doc. A may be displayed.

As illustrated by view 828, upon activating an audio icon 818 and/or scrolling scroll control 836 to a position along the document timeline 802 corresponding to an audio icon 818 (not shown), additional information regarding a third communication event may be provided. For example, an audio recording (or a link to an audio recording) of an audio conference regarding Doc. A may be displayed.

As illustrated by view 830, upon activating a broadcast icon 816 and/or scrolling scroll control 836 to a position along the document timeline 802 corresponding to a broadcast icon 816 (not shown), additional information regarding a fourth communication event may be provided. For example, a video recording (or a link to a video recording) of a video conference (e.g., WebEx meeting, Skype meeting, etc.) regarding Doc. A may be displayed. Additionally or alternatively, a conversation thread (e.g., instant message (IM) or chat thread) that occurred during the video conference may be displayed.

As illustrated by view 832, upon activating a calendar icon 814 and/or scrolling scroll control 836 to a position along the document timeline 802 corresponding to a calendar icon 814 (not shown), additional information regarding a fifth communication event may be provided. For example, a calendar entry for a meeting regarding Doc. A may be displayed.

As should be appreciated, the various features and functionalities of document timeline 802 described with respect to FIG. 8 are not intended to limit associated systems and methods to the particular features and functionalities described. In some aspects, document timeline 802 may be provided in a pane (e.g., second pane) of a document history interface, as previously described. Moreover, view 820-832 may be provided in one or more panes (e.g., third pane, etc.) of a document history interface, as previously described. As should be further appreciated, additional features and functionalities may be associated with the systems and methods described herein and/or some features and functionalities described may be excluded without departing from the systems and methods described herein.

Figure 9:
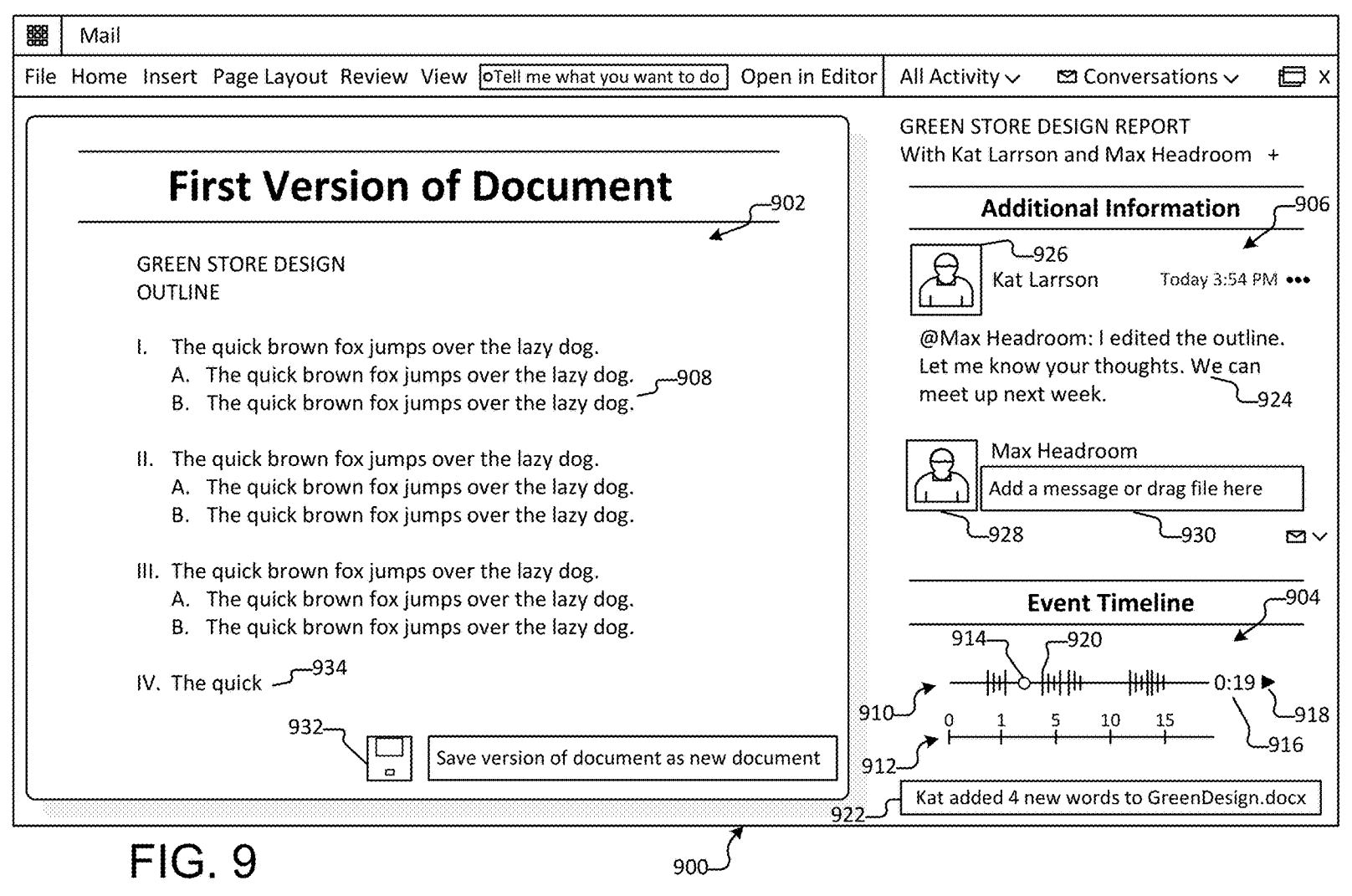

FIG. 9 illustrates an exemplary document history interface for displaying a first version of a document based on an event timeline, according to an example embodiment.

As detailed above, the document history application (e.g., document history application 110 or document history application 206) may generate a document history interface (e.g., document history interface 900) for accessing one or more versions of one or more documents, one or more interactive document timelines, one or more interactive event timelines, additional information regarding the one or more documents and/or one or more events associated with the documents, and the like. In some aspects, as detailed above, the document history interface 900 may provide one or more windows, panes or areas for presenting the various document versions, interactive timelines, and additional information. As illustrated, document history interface 900 includes a first pane 902, a second pane 904, and a third pane 906.

As provided above, the document history application may be incorporated into or in communication with a word processing application and/or collaborative authoring application. In aspects, first pane 902 may provide access to a version of a document for authoring the document. As illustrated, first pane 902 may provide access to a first version of the document including content 908. Authoring the document may include performing authoring actions such as adding content, deleting content, adding formatting, deleting formatting, changing formatting, adding comments, deleting comments, changing comments, and the like. In aspects, one or more toolbars may include one or more authoring controls for performing the authoring actions in the first version of the document.

Additionally, second pane 904 may provide an event timeline 910. In aspects, event timeline 910 may be a graphical rendering showing authoring events received during an authoring session. A descriptive text box 922 may provide context for the authoring session, e.g., an indication of the author and summary of authoring events. In some cases, the descriptive text box 922 may be updated upon scrolling a scroll control 914 to reflect additional authoring events. As illustrated in FIG. 9, descriptive text box 922 indicates that "Kat" is the author and that she "added 4 new words" to the document (e.g., GreenDesign.docx).

Event timeline 910 may also be displayed with a time scale, e.g., time scale 912, which displays appropriate time increments in minutes for an event duration 916 of nineteen minutes (e.g., 00:19; or, if seconds are represented, 00:19:00) for the authoring session. In aspects, event timeline 910 may be interactive, including the scroll control 914 for scrolling backwards and forwards along the event timeline 910. In further aspects, a play control 918 may be provided for the event timeline 910 such that, upon activation of the play control 918, a time-lapse rendition of events over the authoring session may be successively displayed.

In embodiments, a position of the scroll control 914 along the event timeline 910 may determine the information provided in other windows or panes of the document history interface 900. In this example, scroll control 914 is positioned between 1 and 5 minutes (about 00:02:30), as illustrated by time scale 912. Moreover, the first version of the document provided in first pane 902 corresponds to the document as it existed at the point in time designated by the position of the scroll control 914 along event timeline 910 (e.g., at about 00:02:30). When the first version of the document is provided in first pane 902, the document may be saved as a new document by activating save control 932.

Event timeline 910 may further be tagged with one or more identifiers 920 (e.g., hash marks) representing one or more authoring events received during the authoring session. In some aspects, an authoring event may involve an addition, deletion or change to a single character; in other aspects, an authoring event may involve an addition, deletion or change to a word or to a paragraph. As should be appreciated, an authoring event may be defined in any suitable way by any suitable rubric. Moreover, a size of an identifier representing an authoring event may correspond to the extent of the authoring event (e.g., a larger identifier may correspond to a more extensive authoring event and a smaller identifier may correspond to a less extensive authoring event). For instance, the length of a hash mark representing an authoring event may correspond to the extent of the authoring event (e.g., a longer hash mark may correspond to an addition of a paragraph and a shorter hash mark may correspond to a deletion of a word, etc.)

As illustrated by FIG. 9, the first version of the document provided in first pane 902 corresponds to the document as it existed at the point in time designated by the position of the scroll control 914 (e.g., about 00:02:30), which falls after four (4) authoring events along event timeline 910 (each authoring event represented by a hash mark). Further according to this example, an authoring event corresponds to an addition or a deletion of a word, numeral, or punctuation and excludes addition or deletion of spaces. Accordingly, the added content 934 represents four authoring events, e.g., addition of "IV"; "."; "The" and "quick".

In aspects, additional information regarding the authoring session may be provided in third pane 906 of the document history interface 900 upon scrolling to a position along the event timeline 910. Again, in this example, scroll control 914 has been scrolled to a position between 1 and 5 minutes (about 00:02:30), after four (4) authoring events, along the event timeline 910. As illustrated, the additional information provided in third pane 906 includes a first communication 924 sent from user 926 (e.g., "Kat Larrson") to user 928 (e.g., "Max Headroom") at 3:54 pm. As shown, the first communication 924 may be an email communication, instant message (IM) communication, chat communication, SMS communication, etc. In some aspects, the first communication 924 was sent at about the same time as the authoring session (e.g., just before, during, or just after the authoring session). In other aspects, the time that the first communication 924 was sent may correspond to the point in time during the authoring session associated with the position of the scroll control 914 along event timeline 910. When the first communication 924 is displayed, user 928 may reply to the first communication 924 via entry field 930.

As should be appreciated, the various features and functionalities of document history interface 900 described with respect to FIG. 9 are not intended to limit associated systems and methods to the particular features and functionalities described. Accordingly, additional features and functionalities may be associated with the systems and methods described herein and/or some features and functionalities described may be excluded without departing from the systems and methods described herein.

Figure 10:
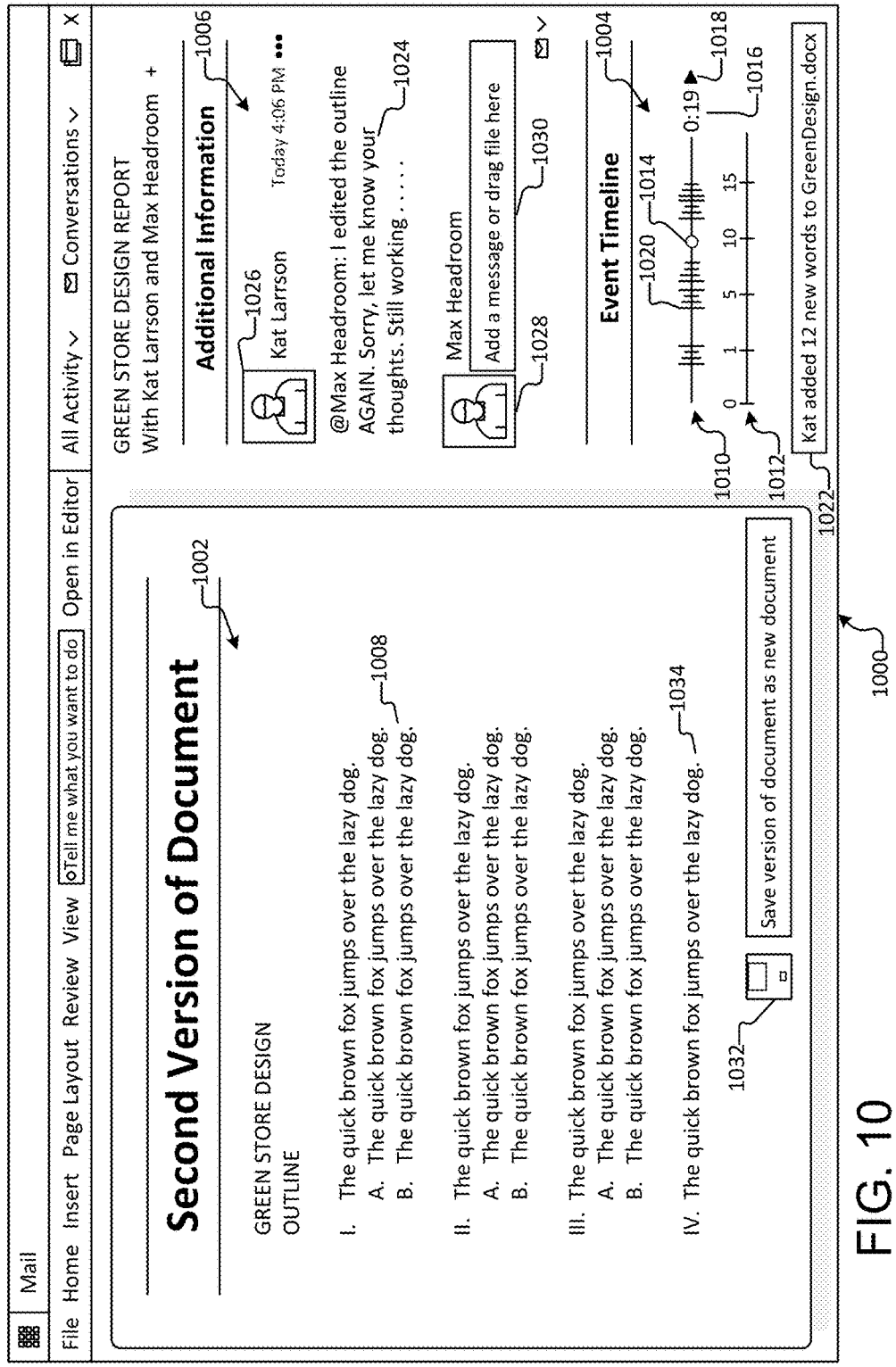
FIG. 10 illustrates an exemplary document history interface for displaying a second version of a document based on an event timeline, according to an example embodiment.

FIG. 10 illustrates an exemplary document history interface for displaying a second version of a document based on an event timeline, according to an example embodiment.

Similar to FIG. 9, document history interface 1000 may provide one or more windows, panes or areas for presenting the various document versions, interactive timelines, and additional information. As illustrated, document history interface 1000 includes a first pane 1002, a second pane 1004, and a third pane 1006.

In this case, first pane 1002 may provide access to a second version of the document including content 1008 and second pane 1004 may provide an event timeline 1010. Similar to event timeline 910, event timeline 1010 may be a graphical rendering showing authoring events received during an authoring session. In this example, FIGS. 9 and 10 illustrate different times during the same authoring session. As such, as illustrated by FIG. 10, descriptive text box 1022 has been updated to provide context for a subsequent time during the authoring session, e.g., indicating that the author, "Kat," has "added 12 new words" to the document (e.g., GreenDesign.docx).

Event timeline 1010 may also be displayed with a time scale, e.g., time scale 1012, which displays an event duration 1016 of nineteen minutes (e.g., 00:19), which reflects the same duration as that of the authoring session of FIG. 9. Event timeline 1010 includes a scroll control 1014 for scrolling backwards and forwards through the authoring session and a play control 1018 for displaying a time-lapse rendition of events over the authoring session.

As illustrated by FIG. 10, scroll control 914 is positioned at 10 minutes (about 00:10:00), as illustrated by time scale 1012. In this case, the second version of the document provided in first pane 1002 corresponds to the document as it existed at the point in time designated by the position of the scroll control 1014 (e.g., about 00:10:00), which falls after twelve (12) authoring events along event timeline 1010 (each authoring event represented by a hash mark). As in the case of FIG. 9, an authoring event corresponds to an addition or a deletion of a word, numeral, or punctuation and excludes addition or deletion of spaces. Accordingly, the added content 1034 represents twelve authoring events, e.g., addition of "IV"; "."; "The"; "quick"; "brown"; "fox"; "jumps"; "over"; "the"; "lazy"; "dog"; and ".". When the second version of the document is provided in first pane 1002, the document may be saved as a new document by activating save control 1032. As should be appreciated, different legacy versions of a document (e.g., first version and second version illustrated in FIGS. 9 and 10) may be saved as new documents upon scrolling to different positions along a document timeline and/or an event timeline.

In aspects, additional information regarding the authoring session may be provided in third pane 1006 of the document history interface 1000 upon scrolling to a position along the event timeline 1010. In this example, scroll control 1014 has been scrolled to a position at about 10 minutes (about 00:10:10), after twelve (12) authoring events, along the event timeline 1010. As illustrated, the additional information provided in third pane 1006 includes a second communication 1024 sent from user 1026 (e.g., "Kat Larrson") to user 1028 (e.g., "Max Headroom") at 4:06 pm. As shown, the second communication 1024 may be an email communication, instant message (IM) communication, chat communication, SMS communication, etc. In some aspects, the time that the second communication 1024 was sent may correspond to the point in time during the authoring session associated with the position of the scroll control 1014 along event timeline 1010. When the second communication 1024 is displayed, user 1028 may reply to the second communication 1024 via entry field 1030.

As should be appreciated, the various features and functionalities of document history interface 900 described with respect to FIG. 10 are not intended to limit associated systems and methods to the particular features and functionalities described. Accordingly, additional features and functionalities may be associated with the systems and methods described herein and/or some features and functionalities described may be excluded without departing from the systems and methods described herein.

Figure 11:
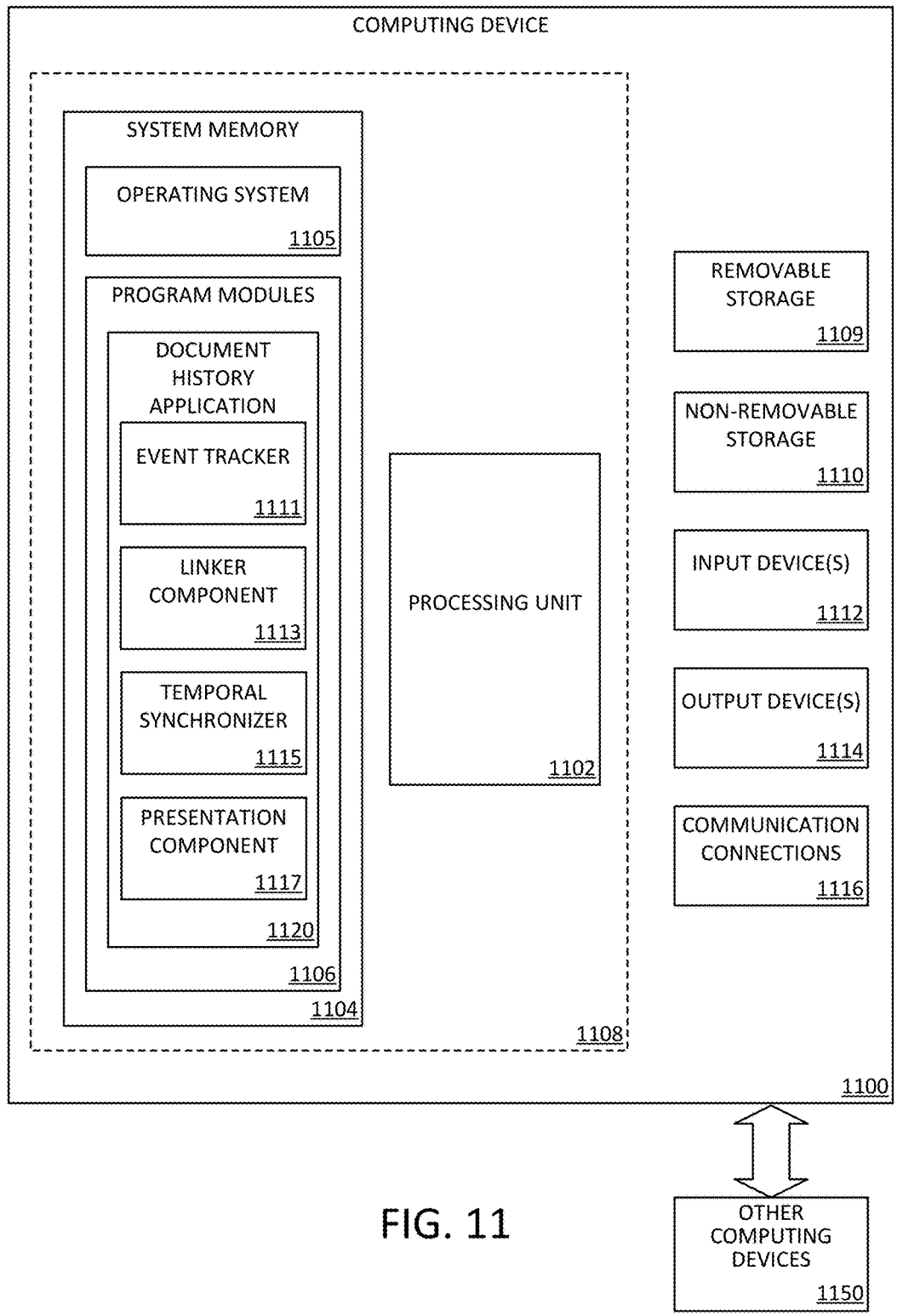
FIG. 11 is a block diagram illustrating example physical components of a computing device with which aspects of the disclosure may be practiced.

FIGS. 11-14 and the associated descriptions provide a discussion of a variety of operating environments in which aspects of the disclosure may be practiced. However, the devices and systems illustrated and discussed with respect to FIGS. 11-14 are for purposes of example and illustration and are not limiting of a vast number of computing device configurations that may be utilized for practicing aspects of the disclosure, described herein FIG. 11 is a block diagram illustrating physical components (e.g., hardware) of a computing device 1100 with which aspects of the disclosure may be practiced. The computing device components described below may have computer executable instructions for implementing a document history application 1120 on a computing device (e.g., server computing device 108), including computer executable instructions for document history application 1120 that can be executed to employ the methods disclosed herein. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories. The system memory 1104 may include an operating system 1105 and one or more program modules 1106 suitable for running document history application 1120, such as one or more components in regards to FIG. 1 and, in particular, tracker component 1111 (e.g., comprising document tracker 112, communication tracker 114 and branching tracker 116), linker component 1113, temporal synchronizer 1115, or presentation component 1117. The operating system 1105, for example, may be suitable for controlling the operation of the computing device 1100. Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the processing unit 1102, the program modules 1106 (e.g., document history application 1120) may perform processes including, but not limited to, the aspects, as described herein. Other program modules that may be used in accordance with aspects of the present disclosure, and in particular for providing a document history interface, may include tracker component 1111, linker component 1113, temporal synchronizer 1115, or presentation component 1117, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114 such as a display, speakers, a printer, etc. may also be included. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 12A:
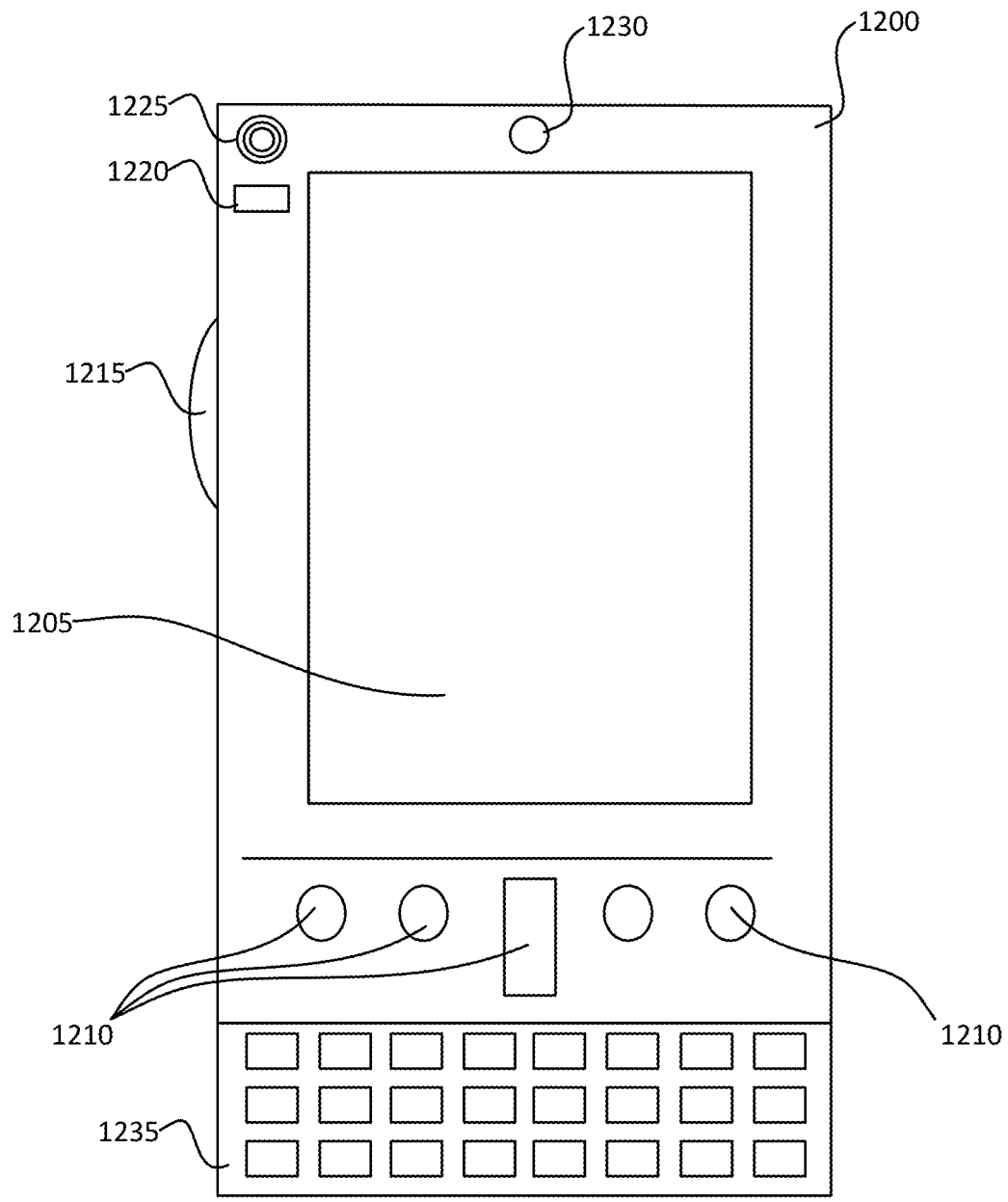
FIGS. 12A and 12B are simplified block diagrams of a mobile computing device with which aspects of the present disclosure may be practiced.
Figure 12B:
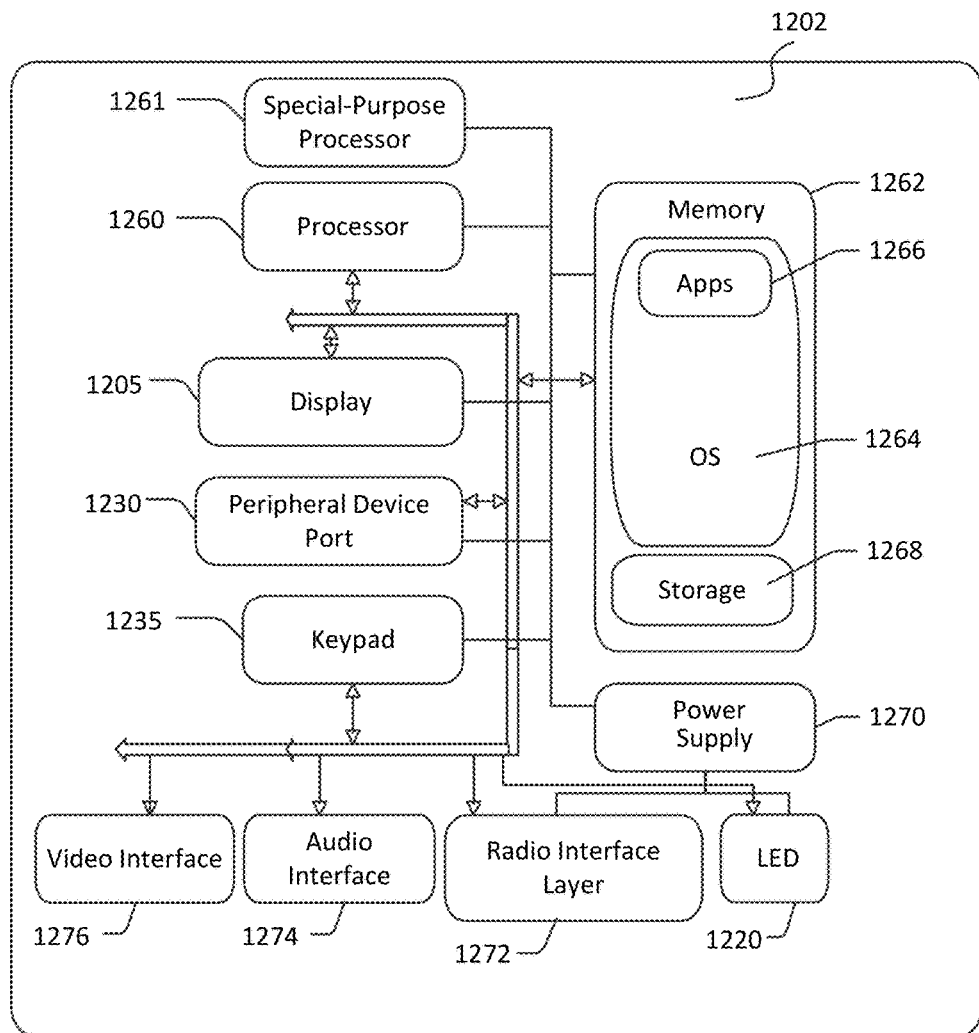

FIGS. 12A and 12B illustrate a mobile computing device 1200, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some embodiments. In yet another alternative embodiment, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various embodiments, the output elements include the display 1205 for showing a graphical user interface (GUI), a visual indicator 1220 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external device.

FIG. 12B is a block diagram illustrating the architecture of one aspect of a mobile computing device. That is, the mobile computing device 1200 can incorporate a system (e.g., an architecture) 1202 to implement some aspects. In one embodiment, the system 1202 is implemented as a "smart phone" capable of running one or more applications (e.g., browser, e-mail, calendaring, contact managers, messaging clients, games, and media clients/players). In some aspects, the system 1202 is integrated as a computing device, such as an integrated personal digital assistant (PDA) and wireless phone.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and so forth. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the mobile computing device 1200, including the instructions for providing a document history interface as described herein (e.g., event tracker, linker component, temporal synchronizer, presentation component, etc.).

The system 1202 has a power supply 1270, which may be implemented as one or more batteries. The power supply 1270 might further include an external power source, such as an AC adapter or a powered docking cradle that supplements or recharges the batteries.

The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated embodiment, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with embodiments of the present disclosure, the microphone may also serve as an audio sensor to facilitate control of notifications, as will be described below. The system 1202 may further include a video interface 1276 that enables an operation of an on-board camera 1230 to record still images, video stream, and the like.

A mobile computing device 1200 implementing the system 1202 may have additional features or functionality. For example, the mobile computing device 1200 may also include additional data storage devices (removable and/or non-removable) such as, magnetic disks, optical disks, or tape. Such additional storage is illustrated in FIG. 12B by the non-volatile storage area 1268.

Data/information generated or captured by the mobile computing device 1200 and stored via the system 1202 may be stored locally on the mobile computing device 1200, as described above, or the data may be stored on any number of storage media that may be accessed by the device via the radio interface layer 1272 or via a wired connection between the mobile computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

Figure 13:
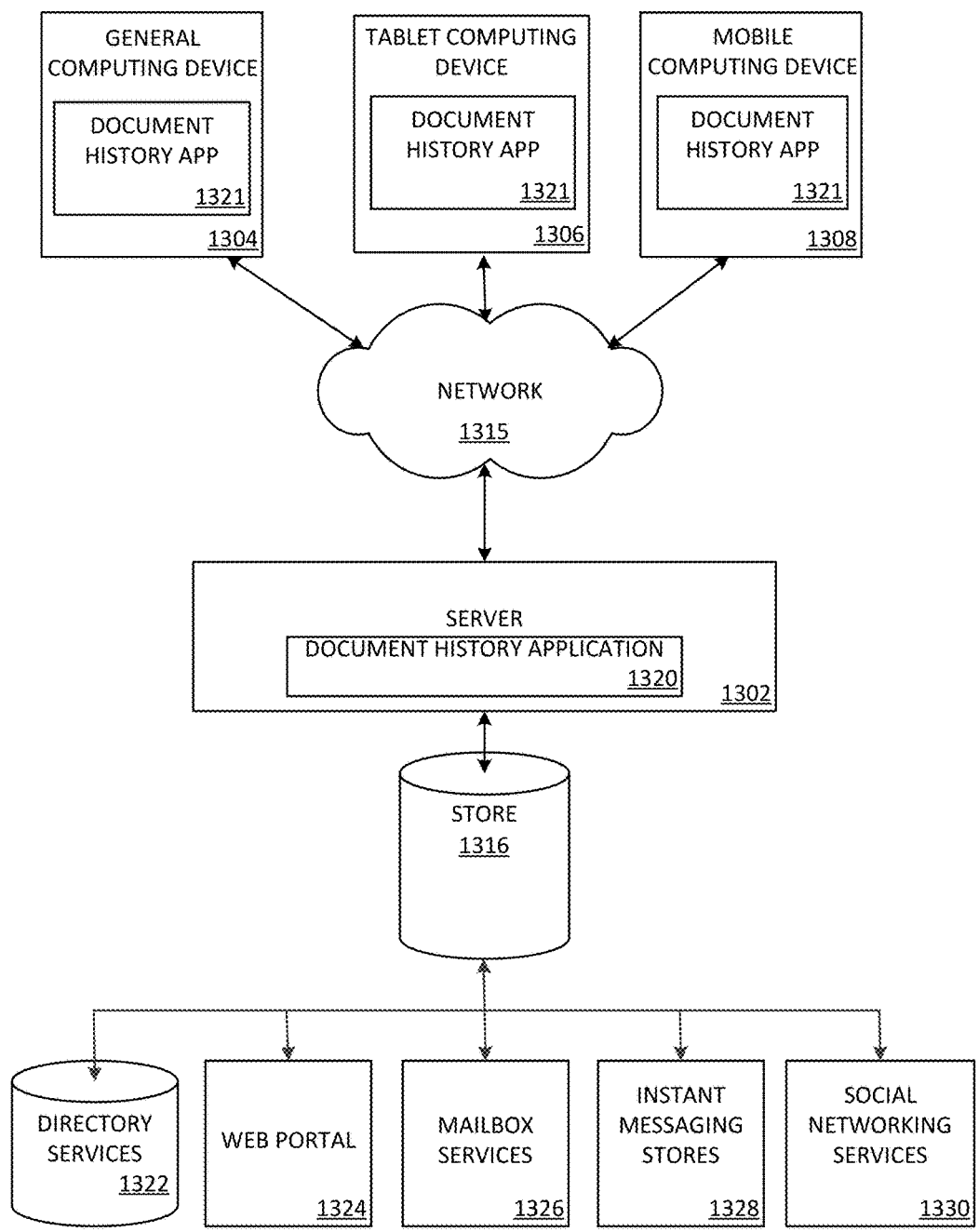
FIG. 13 is a simplified block diagram of a distributed computing system in which aspects of the present disclosure may be practiced.

FIG. 13 illustrates one aspect of the architecture of a system for processing data received at a computing system from a remote source, such as a personal computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The document history app 1321 may be employed by a client that communicates with server device 1302, and/or the document history application 1320 may be employed by server device 1302. The server device 1302 may provide data to and from a client computing device such as a personal computer 1304, a tablet computing device 1306 and/or a mobile computing device 1308 (e.g., a smart phone) through a network 1315. By way of example, the computer system described above with respect to FIGS. 1-12 may be embodied in a personal computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Figure 14:
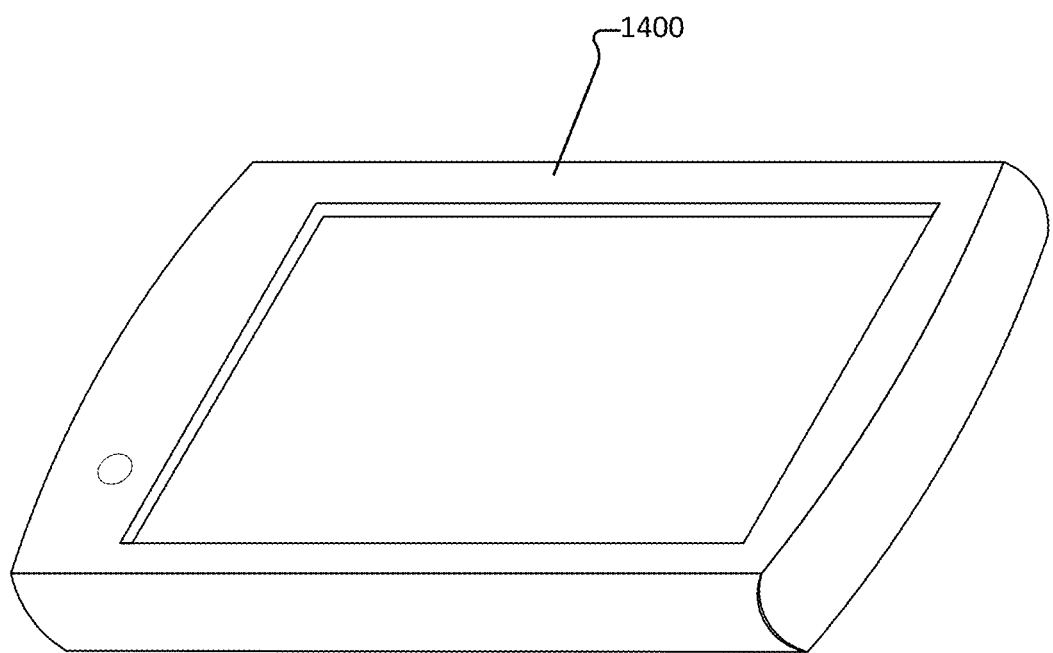
FIG. 14 illustrates a tablet computing device for executing one or more aspects of the present disclosure.

FIG. 14 illustrates an exemplary tablet computing device 1400 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

In a first aspect, a system is provided. The system includes a processing unit and a memory storing computer executable instructions that, when executed by the processing unit, cause the system to perform a method. The method includes providing a first version of a document and generating an interactive document timeline identifying at least one event associated with the document. The method further includes receiving a selection to scroll along the interactive document timeline to the at least one event and providing a second version of the document, where the second version of the document corresponds to the document as it existed at a time when the at least one event occurred. Additionally, the method includes retrieving additional information associated with the at least one event and providing the additional information.

Further with regard to the first aspect, the at least one event is a communication event. In some cases, retrieving additional information associated with the at least one event includes retrieving additional information from a communication application. The additional information may include a communication in which the document was shared, discussed, tasked, calendared or presented. For instance, the communication may be one of an email, an IM, an SMS, a social feed, a calendaring event, a video conference, an audio conference, a presentation, and a task event. Further with regard to the first aspect, the method further includes generating an interactive event timeline identifying at least one authoring event associated with the authoring session. Additionally, the method includes receiving a selection to scroll along the interactive event timeline to the at least one authoring event and providing a third version of the document, wherein the third version of the document corresponds to the document as it existed at a time when the at least one authoring event occurred. Additionally, the method includes receiving a selection to save the second version of the document as a new document and updating the interactive document timeline to reflect at least a second event, wherein the second event corresponds to a branching event. In further examples, the method includes receiving a selection of the second event and providing a second interactive document timeline corresponding to the new document. In some aspects, where the interactive document timeline comprises a play control, the method further includes receiving a selection of the play control and displaying a time-lapse rendition of a document lifecycle for the document. As should be appreciated, the first aspect may involve any of the above examples in any order or combination.

In a second aspect, a system is provided. The system includes a processing unit and a memory storing computer executable instructions that, when executed by the processing unit, cause the system to perform a method. The method includes providing a first version of a document and generating an interactive document timeline associated with the document. The method further includes receiving a selection to scroll to a position along the interactive document timeline and providing a second version of the document, where the second version of the document corresponds to the document as it existed at a time associated with the position. Additionally, the method includes saving the second version of the document as a new document.

Further with regard to the second aspect, the method includes relating the new document to the document. In some examples, the method includes updating the interactive document timeline to reflect an event, wherein the event corresponds to a branching event. Additionally, the method includes receiving a selection of the event and providing a second interactive document timeline corresponding to the new document. In some cases, the interactive document timeline identifies at least one event associated with the document. In further aspects, the method includes receiving a selection to scroll along the interactive document timeline to the at least one event, retrieving additional information associated with the at least one event and providing the additional information. As should be appreciated, the second aspect may involve any of the above examples in any order or combination.

In a third aspect, a method of extracting a portion of an attached file and embedding the extracted portion in a message is provided. The method includes providing a first version of a document and generating an interactive document timeline identifying at least one event associated with the document. The method further includes receiving a selection to scroll along the interactive document timeline to the at least one event, where the at least one event is an authoring session. Additionally, the method includes generating an interactive event timeline identifying at least one authoring event associated with the authoring session, receiving a selection to scroll along the interactive event timeline to the at least one authoring event, and providing a second version of the document, where the second version of the document corresponds to the document as it existed at a time when the at least one authoring event occurred.

Further with respect to the third aspect, the at least one authoring event includes one or more of: opening the document, viewing the document, adding content to the document, deleting content from the document, adding formatting to the document, changing formatting in the document, adding a comment to the document, deleting a comment from the document, and changing a comment in the document. In some examples, where the interactive event timeline comprises a play control, the method includes receiving a selection of the play control and displaying a time-lapse rendition of the authoring session. As should be appreciated, the third aspect may involve any of the above examples in any order or combination. As should be further appreciated, any of the steps or examples of the first, second, or third aspects may be combined in any order or combination.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer executable instructions that, when executed by the at least one processing unit, cause the system to perform a set of operations, the set of operations comprising:
   providing a first version of a document, wherein the document has an associated document identifier;
   receiving two or more communication events, wherein the two or more communication events include a calendar event and an audio or video conferencing event;
   recognizing the two or more communication events as associated with the document based on:
      the calendar event including at least one of the document or the document identifier; and
      a discussion of the document during the audio or video conferencing event;

generating an interactive document timeline identifying the two or more communication events associated with the document, wherein the interactive document timeline includes different graphical identifiers for the two or more communication events;

receiving a selection to scroll along the interactive document timeline to a first communication event of the two or more communication events;

providing a second version of the document, wherein the second version of the document corresponds to the document as it existed at a time when the first communication event of the two or more communication events occurred;

retrieving additional information associated with the first communication event of the two or more communication events; and providing the additional information.

2. The system of claim 1, wherein:

retrieving additional information associated with the first communication event comprises retrieving additional information from a communication application from which the first communication event was generated.

3. The system of claim 2, wherein the additional information comprises a communication in which the document was shared, discussed, tasked, calendared or presented.

4. The system of claim 3, wherein the communication is one of: an email, an IM, an SMS, a social feed, a calendaring event, a video conference, an audio conference, a presentation, and a task event.

5. The system of claim 1, wherein the operations further comprise updating the interactive document timeline to reflect at least a third event, wherein the third event corresponds to a branching event.

6. The system of claim 5, wherein the operations further comprise:

receiving a selection of the third event; and providing a second interactive document timeline corresponding to a new document associated with the branching event.

7. The system of claim 1, wherein the interactive document timeline comprises a play control, and the operations further comprise:

receiving a selection of the play control; and displaying a time-lapse rendition of a document lifecycle for the document.

8. The system of claim 1, further comprising a first graphical identifier for a first event of the two or more events and a second graphical identifier for the second event of the two or more events, the first and second graphical identifiers being indicative of different types of events.

9. The system of claim 1, wherein the additional information includes at least one of the calendar event or a recording of the audio or video conferencing event.

10. The system of claim 1, wherein the two or more communication events are received from at least a first communication application and a second communication application.

11. A system comprising:

at least one processing unit; and at least one memory storing computer executable instructions that, when executed by the at least one processing unit, cause the system to perform a set of operations, the set of operations comprising:

providing a first version of a document, wherein the document has an associated document identifier;

receiving two or more events, wherein the two or more events include an authoring event and a communication event;

recognizing the communication event as associated with the communication event based on the communication event including at least one of the document or the document identifier;

generating an interactive document timeline identifying the two or more events associated with the document, wherein the interactive document timeline includes different graphical identifiers for at least two events of the two or more events;

receiving a selection to scroll to a position of a first event of the two or more events along the interactive document timeline;

providing a second version of the document, wherein the second version of the document corresponds to the document as it existed at a time associated with the position; and saving the second version of the document as a new document.

12. The system of claim 11, wherein the operations further comprise creating a relationship between the new document and the document.

13. The system of claim 12, wherein the operations further comprise updating the interactive document timeline to reflect a second event of the two or more events, wherein the second event corresponds to a branching event corresponding to the saving of the new document.

14. The system of claim 13, wherein the operations further comprise:

receiving a selection of the second event; and providing a second interactive document timeline corresponding to the new document.

15. The system of claim 11, wherein the operations further comprise:

receiving a selection to scroll along the interactive document timeline to the first event of the two or more events;

retrieving additional information associated with the first event of the two or more events; and providing the additional information.

16. The system of claim 11, wherein the operations further comprise:

displaying at least a portion of the document in a first pane of a coauthoring application that provided the document; and concurrently displaying the interactive document timeline in a second pane of the coauthoring application.

17. The system of claim 16, wherein the interactive document timeline includes a first authoring session timeline for a first user of the coauthoring application and a second authoring session timeline for a second user of the coauthoring application.

18. A method of extracting a portion of an attached file and embedding the extracted portion in a message, the method comprising:

providing a first version of a document;

generating an interactive document timeline identifying two or more events associated with the document, wherein the interactive document timeline includes different graphical identifiers for at least two events of the two or more events, and wherein the at least two events are different types of communication events comprising:

meeting regarding the document during a calendar event; and discussing the document during an audio or video conferencing event;

receiving a selection to scroll along the interactive document timeline to a first event of the two or more events; and providing a second version of the document, wherein the second version of the document corresponds to the document as it existed at a time when the first event of the two or more events occurred.

19. The method of claim 18, the interactive document timeline identifying a second event of the two or more events associated with the document, wherein the second event is an authoring event comprising one or more of:

opening the document;
viewing the document;
adding content to the document;
deleting content from the document;
adding formatting to the document;
changing formatting in the document;
adding a comment to the document;
deleting a comment from the document; and
changing a comment in the document.

20. The method of claim 18, wherein the interactive document timeline comprises a play control, further comprising:

receiving a selection of the play control; and
displaying a time-lapse rendition of the interactive document timeline.

* * * * *